United States Patent
Tech et al.

(10) Patent No.: US 10,506,214 B2
(45) Date of Patent: *Dec. 10, 2019

(54) CONCEPT FOR DETERMINING A MEASURE FOR A DISTORTION CHANGE IN A SYNTHESIZED VIEW DUE TO DEPTH MAP MODIFICATIONS

(71) Applicant: GE VIDEO COMPRESSION LLC, Albany, NY (US)

(72) Inventors: Gerhard Tech, Berlin (DE); Karsten Mueller, Berlin (DE); Thomas Wiegand, Berlin (DE)

(73) Assignee: GE VIDEO COMPRESSION, LLC, Albany, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/167,702

(22) Filed: Oct. 23, 2018

(65) Prior Publication Data
US 2019/0058866 A1 Feb. 21, 2019

Related U.S. Application Data

(63) Continuation of application No. 15/837,989, filed on Dec. 11, 2017, now Pat. No. 10,154,245, which is a (Continued)

(51) Int. Cl.
*H04N 13/161* (2018.01)
*H04N 13/111* (2018.01)
(Continued)

(52) U.S. Cl.
CPC ......... *H04N 13/161* (2018.05); *G06T 15/205* (2013.01); *H04N 13/111* (2018.05); *H04N 13/122* (2018.05); *H04N 13/128* (2018.05)

(58) Field of Classification Search
CPC combination set(s) only.
See application file for complete search history.

(56) References Cited

U.S. PATENT DOCUMENTS

| 9,066,075 B2 | 6/2015 | Kim et al. |
| 2007/0109409 A1 | 5/2007 | Yea et al. |
| 2011/0292044 A1 | 12/2011 | Kim et al. |

FOREIGN PATENT DOCUMENTS

WO   2010093351 A1   8/2010

OTHER PUBLICATIONS

Berretty, R. et. al., "High Quality Images from 2.5D Video", Short Presentations Eurographics, 2003, pp. 1-8.
(Continued)

*Primary Examiner* — Janese Duley
(74) *Attorney, Agent, or Firm* — Pillsbury Winthrop Shaw Pittman LLP

(57) ABSTRACT

An apparatus for determining a measure for a distortion change of a first view synthesized from a second view, caused by a modification of a depth map of the second view from a first state to a second state, is configured—starting from a current synthesis state of the first view corresponding to a synthesis from the second view having the depth map modified to the second state in an already processed portion of the depth map and having the depth map unmodified at the first state in a yet to be processed portion of the depth map—to compute a possible successor synthesis state corresponding to a synthesis of the first view from the second view having the depth map modified to the second state in an already processed portion plus a currently processed portion and having the depth map unmodified at the first state in the yet to be processed portion without the currently processed portion; and to determine a distortion change of a distortion of the current synthesis state of the first view relative to an undistorted version of the first view to a
(Continued)

distortion of the possible successor synthesis state of the first view relative to the undistorted version of the first view.

20 Claims, 13 Drawing Sheets

Related U.S. Application Data continuation of application No. 15/363,378, filed on Nov. 29, 2016, now Pat. No. 9,877,008, which is a continuation of application No. 14/272,690, filed on May 8, 2014, now Pat. No. 9,544,567, which is a continuation of application No. PCT/EP2012/072128, filed on Nov. 8, 2012.

(60) Provisional application No. 61/558,656, filed on Nov. 11, 2011.

(51) Int. Cl.
  *H04N 13/128* (2018.01)
  *G06T 15/20* (2011.01)
  *H04N 13/122* (2018.01)

(56) References Cited

OTHER PUBLICATIONS

Berretty, R. et. al., "Real Time Rendering for Multiview Autostereoscopic Displays", Stereoscopic Displays and Virtual Reality Systems XIII, SPIE Conference Series, vol. 6055, Feb. 2006, pp. 208-219.

DeSilva et al., "A Novel Depth Map Quality Metric and its Usage in Depth Map Coding", 3 DTV Conference: The True Vision-Capture, Transmission and Display of 3D Video; May 16, 2011, 4 pages.

Kim et al., "Depth Map Coding with Distortion Estimation of Rendered View", Proceedings of SPIE-IS&T Electronic Imaging, vol. 7543, 2010, 10 pages.

Official Communication issued in International Patent Application No. PCT/EP2012/072128, dated Jan. 31, 2013.

Tech, G. et. al., "Diffusion Filtering of Depth Maps in Stereo Video Coding", 28th Picture Coding Symposium, Dec. 2010, pp. 306-309.

Tech, G. et. al., "Evaluation of View Synthesis Algorithms for Mobile 3DTV", Proceedings of IEEE 3DTV Conference, May 16-18, 2011, pp. 1-4.

Tech, G. et. al., "Final Report on Coding Algorithms for Mobile 3DTV", Mobile 3DTV, Technical Report D2.6, Feb. 2011, 53 pages.

Notice of Allowance U.S. Appl. No. 15/837,989 dated Jul. 23, 2018.

CONCEPT FOR DETERMINING A MEASURE FOR A DISTORTION CHANGE IN A SYNTHESIZED VIEW DUE TO DEPTH MAP MODIFICATIONS

CROSS-REFERENCE TO RELATED APPLICATIONS

This application is a Continuation of U.S. Ser. No. 15/837,989, filed Dec. 11, 2017, which is a Continuation of U.S. application Ser. No. 15/363,378 filed Nov. 29, 2016, now U.S. Pat. No. 9,877,088, which is a Continuation of U.S. application Ser. No. 14/272,690, filed May 8, 2014, now U.S. Pat. No. 9,544,567, which is a continuation of International Application No. PCT/EP2012/072128, filed Nov. 8, 2012, which claims priority from U.S. Application No. 61/558,656, filed Nov. 11, 2011. Each of the above-identified patent applications and patents is incorporated herein by reference in entirety.

The present invention is concerned with determining a measure for a distortion change in a synthesized view due to depth map modifications in the reference view such as occurring in depth map encoding, depth filtering, a depth estimation or the like.

BACKGROUND OF THE INVENTION

For the representation of stereo and 3D-video several methods have been proposed [1]. One of the methods for 3D video is the Multi-View plus Depth (MVD) format. The MVD-format stores the scene information as two or multiple texture views depicting the 3D-scene from different perspectives. Additionally the scene geometry is represented by a full dense depth map per texture view. The MVD format supports the generation additional texture views located in between the provided views by depth image based rendering (DIBR). For this the samples of the views' textures are warped using disparities obtained from their depth map.

Modern auto stereoscopic displays provide a high view density with eight to 28 or even more views. However, recording of a 3D scene in a real live scenario can only be accomplished with a small number of cameras. Thus, the possibility to generate intermediate views as provided by the MVD format is a feature that may be used for a 3D video system. Moreover the usage of depth maps and view interpolation provide advantages regarding the transmission of 3D-video. Depth maps can be coded at a highly reduced rate compared to a video view and may use less bandwidth.

Compared to multi-view video, the generation and transmission of depth based video involves additional processing steps at the sender and receiver side. In particular, depth modifications due to, for example, lossy compression, results in distortions of the depth map itself. However, most importantly is the distortion of a synthesized view synthesized from the view of the modified depth map, and accordingly, for performing a rate/distortion optimization correctly, the distortion caused by the modification of depth map would have to be somehow taken into account when optimizing. However, until now, such determination is not performed in an exact manner due to the overhead associated therewith.

SUMMARY

According to an embodiment, an apparatus for determining a measure for a distortion change of a first view synthesized from a second view, caused by a modification of a depth map of the second view from a first state to a second state, may be configured to perform the steps of: starting from a current synthesis state of the first view corresponding to a synthesis from the second view having the depth map modified to the second state in an already processed portion of the depth map and having the depth map unmodified at the first state in a yet to be processed portion of the depth map, computing a possible successor synthesis state corresponding to a synthesis of the first view from the second view having the depth map modified to the second state in an already processed portion plus a currently processed portion and having the depth map unmodified at the first state in the yet to be processed portion without the currently processed portion; determining a distortion change of a distortion of the current synthesis state of the first view relative to an undistorted version of the first view to a distortion of the possible successor synthesis state of the first view relative to the undistorted version of the first view.

According to another embodiment, a method for determining a measure for a distortion change of a first view synthesized from a second view, caused by a modification of a depth map of the second view from a first state to a second state, may have the steps of: starting from a current synthesis state of the first view corresponding to a synthesis from the second view having the depth map modified to the second state in an already processed portion of the depth map and having the depth map unmodified at the first state in an yet to be processed portion of the depth map, computing a possible successor synthesis state corresponding to a synthesis of the first view from the second view having the depth map modified to the second state in an already processed portion plus a currently processed portion and having the depth map unmodified at the first state in the yet to be processed portion without the currently processed portion; determining a distortion change of a distortion of the current synthesis state of the first view relative to an undistorted version of the first view to a distortion of the possible successor synthesis state of the first view relative to the undistorted version of the first view.

According to another embodiment, a computer program may have a program code for performing, when running on a computer, a method according to claim 15.

In particular, in accordance with embodiments of the present invention, an apparatus for determining a measure for a distortion change of a first view synthesized from a second view, caused by a modification of a depth map of the second view from a first state to a second state is configured—starting from a current synthesis state ($s'_T$) of the first view corresponding to a synthesis from the second view ($s_T$) having the depth map modified to the second state ($\tilde{s}_D$) in an already processed portion ($B_1 \cup B_2 \ldots B_{N-1}$) of the depth map and having the depth map unmodified at the first state ($s_D$) in a yet to be processed portion ($I \setminus (B_1 \cup B_2 \ldots \cup B_{N-1})$) of the depth map—to compute a possible successor synthesis state corresponding to a synthesis of the first view from the second view ($s_T$) having the depth map modified to the second state ($\tilde{s}_D$) in an already processed portion ($B_1 \cup B_2 \ldots \cup B_{N-1}$) plus a currently processed portion ($B_N$) and having the depth map unmodified at the first state ($s_D$) in the yet to be processed portion ($I \setminus (B_1 \cup B_2 \ldots \cup B_{N-1})$) without the currently processed portion; and to determine a distortion change ($\Delta D_{B_N}$) of a distortion of the current synthesis state ($s'_T$) of the first view relative to an undistorted version of the first view to a distortion of the possible successor synthesis state ($s'_T$) of the first view relative to the undistorted version of the first view.

BRIEF DESCRIPTION OF THE DRAWINGS

Embodiments of the present invention will be detailed subsequently referring to the appended drawings, in which.

DETAILED DESCRIPTION OF THE INVENTION

As described above, compared to multi-view video, the generation and transmission of depth based video involves additional processing steps at the sender and receiver side. These steps are shown in the top box of FIG. 1.

Figure 1:
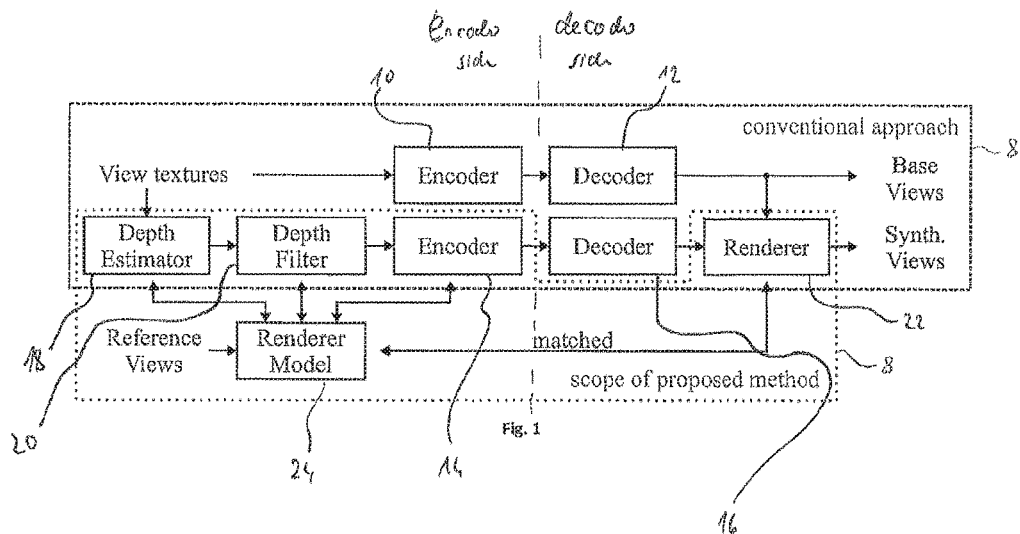
FIG. 1 shows processing steps to generate and transmit a video plus depth based 3D video format as a possible application scenario where embodiments of the present invention may be employed.

Thus, FIG. 1 shows a possible environment into which the embodiments of the present invention outlined further below may be advantageously employed. In particular, FIG. 1 shows a multi-view coding environment where a pair of encoder 10 and decoder 12 is responsible for coding/decoding the texture sample arrays of the different views of a multi-view signal, while a pair of encoder 14 and decoder 16 is responsible for encoding and decoding the associated depth/disparity maps associated with each view. The encoding of encoders 10 and 14 may be implemented so as to achieve lossy compression such as by way of block-based hybrid coding. The decoders 12 and 16 reconstruct the reconstructible version of texture and depth/disparity maps, respectively. Within the encoder side, a depth estimator 18 may be provided in order to estimate the depth/disparity map associated with each picture/texture map of the views, with depth filter 20 being configured to remove estimation outliers from the estimated depth/disparity maps. In particular, the depth estimator 18 associates, for example, a depth/disparity value with each texture sample of the views. In the following description, the term "depth map" shall encompass both versions, the association of a disparity value or an association of a depth value to the texture samples as depth and disparity are easily convertible to each other. The lossy nature of the compression performed by encoder 14 causes modifications in the depth maps resulting from depth estimator 18 and depth filter 20 and assuming that the output of modules 18 and 20 was correct, these modifications cause, naturally, quality degradations in views synthesizable from the base views using these modified depth maps, namely by warping the base views using the modified depth maps into other views such as intermediate views or the like. Conventionally, i.e. in conventional coding environments 8, as a measure for these degradations, a measure of the variation of the depth map itself is used. However, the depth map variation is not visible to the user, and accordingly such a depth map variation measure is not a good measure for the distortion in the synthesized views caused by the depth map modifications caused by encoder 14. Accordingly, a renderer model 24 configured to determine a measure for a distortion change of a synthesized view caused by such depth map modification is introduced into the chain of depth map estimator 18 down to a renderer 22 which renders the synthesized views based on the reconstructed texture and reconstructed depth map. The renderer 24 is connected with renderer 22 so as to steer or control the optimization of the parameter settings within each of, or at least a part of, modules 18, 20 and 14. To this end, the renderer model 24 compares the synthesized views resulting from the depth map modifications as obtained from renderer 22 either with reference views, which might be provided from elsewhere, or with the synthesized views resulting from synthesizing using the originally estimated or originally estimated and filtered depth maps.

Thus, in FIG. 1 each of modules 8 (as far as the encoding side is concerned), 18, 20 and 14 may act as a depth modifier performing trials of different modifications of a depth map, and the renderer model 24 along with renderer 16 form an apparatus for determining a measure for a distortion change in accordance with the below outlined procedure. They participate in searching the best trial in terms of a rate/distortion optimization sense or some other cost function optimization using a cost function depending on a distortion of the synthesized view.

The depth estimation step may be performed if depth data has not been directly recorded with depth cameras. Disparity maps corresponding to the views' textures are obtained carrying out stereo or multi-view matching. After depth estimation an optional depth filtering can be applied, to reduce irrelevant signal parts and noise from the depth maps. Subsequently the depth data is encoded, transmitted and decoded. At the receiver side the rendering of the intermediate views has to be carried out.

Conventionally depth estimation, filtering and encoding are conducted independently from the rendering process. However, an improvement in all three steps can be achieved by regarding the rendering process and the synthesized view distortion, as depicted in the bottom box in FIG. 1. Therefore, an embodiment for synthesized view distortion computation is presented hereinafter. Approximations for the synthesized view distortions have been analyzed and used in encoding in [2], [3] and [4]. However, in contrast to these approaches, the embodiment outlined below forms a renderer that provides not an approximation but the correct synthesized view distortion change assuming a simple renderer. The renderer determines a measure for a distortion change of a first view synthesized from a second view, caused by a modification of a depth map of the second view. The renderer supports the basic functionalities shared by most rendering approaches, like sub pixel accurate warping, hole filling and view blending. To calculate the synthesized view distortion depending on a distortion of the depth signal the renderer is modeled as a state machine, called renderer model in the following. The renderer model is designed for fast re-rendering of parts of the synthesized view to obtain the synthesized view distortion.

In following subsections 1.1.1 and 1.1.2 the basic idea of the renderer and related works for comparison reasons are discussed in detail. Subsequently the renderer considered for distortion computation is presented in section 1.2. How this renderer can be extended to the renderer model is described in section 1.3. Finally the new features of the renderer model are summarized in section 1.4.

1.1.1 Basic Idea

The geometry information given by depth data are exploited in the rendering process only. Hence distortions of depth data lead indirectly to subjective perceivable synthesized view distortions. The depth map itself is not visible for a viewer. Applications processing depth data, like depth estimation, depth filtering or depth coding can be improved by regarding this property. Therefore decisions carried out within the depth processing algorithm can be modified to be based on the synthesized view distortion instead of the depth distortion.

Assuming the extrapolation of a the synthesized texture $s_T'$ the rendering process can be modeled as function of an input depth map $s_D$ and an input texture $s_T$ $$s_T'(x',y') = f_R[s_T(x,y), s_D(x,y)] \quad (1)$$

with (') marking signals in the synthesized domain. Given the texture $\tilde{s}_T'$ synthesized from distorted depth data $\tilde{s}_D$, the synthesized view distortion D can be defined as the sum of squared differences to a reference view $s_{Ref}'$ as shown in eq. (2).

$$D = f_D(\tilde{s}_T', s_{Ref}') = \sum_{x'=1}^{w} \sum_{y'=1}^{h} [\tilde{s}_T'(x', y') - s_{Ref}'(x', y')]^2 \quad (2)$$

with w and h denoting the width and height of the view. Depending on the use case $s_{Ref}'$ can be an original texture at the position of the synthesized view or the texture $s_T'$ synthesized from original video data $s_T$ and depth data $s_D$. Note that if an original texture is used, the initial synthesized view distortion $D_0$ related to the original depth map might not be equal to zero.

Combining eq. (1) and eq. (2) shows that D is a function of the input texture $s_T$, the distorted input depth $\tilde{s}_D$ and the reference texture $s_{Ref}'$. For simplification a constant $s_T$ and a constant $s_{Ref}'$ is assumed in the following. Thus, the synthesized view distortion D is expressed as function of the input depth map only.

$$D = f_D(\tilde{s}_D) \quad (3)$$

D is the total distortion of the whole view related to the complete distorted depth map $\tilde{s}_D$. However, processing of depth data is commonly applied block wise. Hence, a distortion function similar to eq. (2) providing a global distortion related to complete distorted depth map $\tilde{s}_D$ is not useful. Commonly distortion functions $f$ applied in depth processing have two properties. First of all only the distortion $D_B$ caused by the change of the depth within a block B of the depth map $s_D$ is of interest. Therefore $f$ relates the distorted depth data within block B to the distortion $D_B$ $$D_B = f[\tilde{s}_D(B)] \quad (4)$$

with $\tilde{s}_D(B)$ denoting the part of $\tilde{s}_D(x,y)$ with $(x,y) \in B$.

Secondly, $f$ should satisfy the superposition property. It should be possible to obtain the distortion caused by a change of the depth data in different blocks independently. The sum of this independently computed distortions should be equal to the distortion obtained for the block merged of all blocks. For e.g. a distortion of the depth data of two blocks $B_1$ and $B_2$ $$D_{B_1 \cup B_2} = f[\tilde{s}_D(B_1 \cup B_2)] \stackrel{!}{=} D_{B_1} + D_{B_2} = f[\tilde{s}_D(B_1)] + f[\tilde{s}_D(B_2)] \quad (5)$$

should be true. Here, $D_{B_1 \cup B_2}$ denotes the distortion related to the merged block $B_1 \cup B_2$.

Some depth coding ([4], [3]) approaches use a distortion function offering these two properties. However, these approaches only provide an approximation of the synthesized view distortion. In the following it is shown that these two properties cannot be fulfilled by a distortion function providing a correct synthesized distortion and not an approximation. Moreover it is presented how a distortion function with similar properties suitable for depth processing can be constructed.

To get a further insight, how the correct synthesized view distortion is calculated and how it can be related to parts of the input depth map a distorted depth map consisting of two blocks $B_1$ and $B_2$ is analyzed. Eq. (2) shows that the correct synthesized view distortion is a function of the synthesized view $s_T'$. The synthesized view again depends through the rendering on all samples $B_1 \cup B_2 = I$ of depth map in a nonlinear way as can be seen in eq. (1). Due to occlusion and hole filling a change of the depth data within a block cannot be related to synthesized view distortion without regarding depth data outside the block. It is for example possible, that positions in the synthesized view related to $B_1$ are occluded by samples shifted from positions of $B_2$. Or the change of the depth data within $B_1$ uncovers samples shifted from block $B_2$. Samples belonging to $B_1$ and $B_2$ can interact in the synthesized view, producing a mutual distortion term $D_{B_1 \cap B_2}$, that cannot be related to $B_1$ or $B_2$ solely. Hence, the total synthesized view distortion can formally be defined as $$D_{B_1 \cup B_2} = f_D[\tilde{s}_D(B_1 \cup B_2)] \quad (6)$$
$$= D_{B_1} + D_{B_2} + D_{B_1 \cap B_2} + D_0$$
$$\neq D_{B_1} + D_{B_2}$$

with $D_0$ denoting the initial distortion and $D_{B_1}$ and $D_{B_2}$ denoting distortion terms solely related to $B_1$ or $B_2$. Eq. (6) shows that the distortion $D_{B_1 \cup B_2}$ related to the merged blocks $B_1$ and $B_2$ cannot be derived by summing up independently obtained distortion $D_{B_1}$ and $D_{B_2}$. A superposition as shown in eq. (5) is not possible.

However, as stated above, the superposition property may be used for most applications. To resolve this issue, a distortion function satisfying the superposition property can by constructed by considering a block related global synthesized view distortion change $\Delta D$. Assuming a sequential processing of the blocks of the depth map the distortion change of the first block can be defined as $$\Delta D_{B_1} = f_D[\{\tilde{s}_D(B_1), s_D(B_2)\}] - D_0 \quad (7)$$

with $\{\tilde{s}_D(B_1),s_D(B_2)\}$ denoting the image formed from $\tilde{s}_D(x,y)$ for $(x,y)\in B_1$ and $s_D(x,y)$ for $(x,y)\in B_2$. Hence the distortion change $\Delta D_{B_1}$ related to $B_1$ is the global distortion of the texture rendered from the depth map consisting of distorted depth data within block $B_1$ and original depth data outside of $B_1$ minus the initial distortion $D_0$. Similarly the distortion change $\Delta D_{B_2}$ for the second block is $$\Delta D_{B_2} = f_D[\tilde{s}_D(B_1 \cup B_2)] - f_D[\{\tilde{s}_D(B_1), s_D(B_2)\}] \quad (8)$$
$$= f_D[\tilde{s}_D(B_1 \cup B_2)] - \Delta D_{B_1} - D_0$$
$$= D_{B_1 \cup B_2} - \Delta D_{B_1} - D_0$$
$$= D_{B_1 \cup B_2} - \Delta D_{B_1}$$

It can be seen from eq. (8) that using the distortion change as distortion function satisfies the superposition property. Generalizing eq. (8) leads to a distortion change for block $B_N$ of $$\Delta D_{B_N} = f_D\left[\left\{\tilde{s}_D\left(\bigcup_{i=1}^{N} B_i\right), s_D\left(I \setminus \bigcup_{i=1}^{N} B_i\right)\right\}\right] - \quad (9)$$
$$= f_D\left[\left\{\tilde{s}_D\left(\bigcup_{i=1}^{N-1} B_i\right), s_D\left(I \setminus \bigcup_{i=1}^{N-1} B_i\right)\right\}\right]$$
$$= D_{B_1 \cup B_2 \ldots \cup B_N} - D_{B_1 \cup B_2 \ldots \cup B_{N-1}}$$
$$= D_{B_1 \cup B_2 \ldots \cup B_N} - \sum_{i=1}^{N-1} \Delta D_{B_i}$$

with $I \setminus B$ denoting all samples with $(x,y)\notin B$.

The global distortion change defined by eq. (9) provides a block related distortion metric with superposition property. However, due to the recursive definition of $\Delta D_{B_N}$ it also depends on the view distortion currently realized in other blocks of input depth data. Hence, the value of $\Delta D_{B_N}$ also depends on the processing order of the blocks of the input depth. This dependency is a minor disadvantage that is shared by other algorithm like e.g. entropy coding or intra coding.

Figure 2:
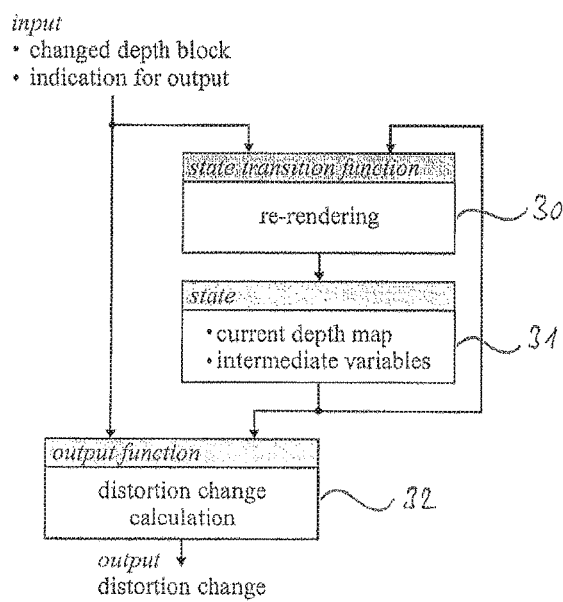
FIG. 2 shows a rendering process according to an embodiment, modeled as state machine.

As can be seen from eq. (9), the computation of the distortion change $\Delta D_{B_N}$ involves rendering a synthesized texture using the depth data of the previous distortion computation modified with the new data of $B_N$ block. However, the complete rendering of a whole view is computational too complex to be feasible. To overcome this problem a method is presented that only re-renders parts of the synthesized view, that are affected by the change of the depth data in the block $B_N$. Therefore intermediate data of the rendering process are stored and used together with the new depth data for re-rendering. FIG. 2 shows how this re-rendering method can be modeled as state machine. In the following this state machine is called renderer model.

Accordingly, a measure for a distortion change of a first view synthesized from a second view, caused by a modification of a depth map of the second view from a first state to a second state may determine effectively if, starting from a current synthesis state of the first view corresponding to a synthesis from the second view having the depth map modified to the second state $(\tilde{s}_D)$ in an already processed portion $B_1 \cup B_2 \ldots \cup B_{N-1}$ of the depth map and having the depth map unmodified at the first state $s_D$ in a yet to be processed portion $I \setminus (B_1 \cup B_2 \ldots \cup B_{N-1})$ of the depth map, a possible successor synthesis state corresponding to a synthesis of the first view from the second view having the depth map modified to the second state $\tilde{s}_D$ in an already processed portion $(B_1 \cup B_2 \ldots B_{N-1})$ plus a currently processed portion $B_N$ and having the depth map unmodified at the first state $(s_D)$ in the yet to be processed portion $I \setminus (B_1 \cup B_2 \ldots \cup B_{N-1})$ without the currently processed portion is computed, with then determining a distortion change $\Delta D_{B_N}$ of a distortion of the current synthesis state of the first view relative to an undistorted version of the first view to a distortion of the possible successor synthesis state $(s'_T)$ of the first view relative to the undistorted version of the first view at 32. The state is, however, not changed until the modification of the depth map has been finally determined. The latter change of the renderer's state, i.e. the update, is performed at 30 with the result of step 30 being the new, updated state 31. The flow chart of FIG. 2 is passed for each currently processed portion until the final selection of the modification of the depth map therein, with then passing the flow chart for the subsequent to be processed portion. This is, what the renderer 24 described further below does.

In particular, the depth map modification may have been caused by any of modules 18, 20 and 14, and the currently processed portion may correspond to, for example, the currently inspected block of the block-based hybrid encoding of encoder 14, or some other currently processed portion of depth estimator 18 and depth filter 20, respectively. In that case, the already processed portion would be the sum of already passed blocks of encoder 14 or the already passed portions of estimator 18 and filter 20, respectively, while the remaining yet to be processed portions would correspond to blocks within the currently coded depth map not yet passed by encoder 14 or depth map estimator 18 and depth filter 20, respectively.

The renderer model is defined by its possible inputs and outputs, the renderer's state 31, a state transition function 30 and an output function 32. The input to the renderer model consists of the position and size of a depth block to change, i.e. the currently processed portion, and the changed depth data itself. Moreover an indication is given within an input, determining if a state transition should be carried out or if the distortion change should be given as output, i.e. as to whether the depth map modification is finally selected so that state 31 may be changed according to the final selection. The set of the states comprises all possible depth maps, combined with all possible states of the intermediate variables used for re-rendering. If the wish for a state transition is signalized in the input, i.e. the final selection of depth modification has been made, the state transition function 30 performs the re-rendering of the block of changed depth data utilizing the current renderer state from the feedback loop leading from the state's 31 output to the input of function 30, and an empty output is given. Otherwise the output function 32 computes the distortion change, using the input data and the current state 31. The result is given as output and the render model stays in the same state. The possibility to obtain the synthesized distortion change without altering the renderer's state 31 is provided to allow a fast evaluation of multiple different depth changes.

So far only the extrapolation of a view from one texture and one depth map has been regarded as given in eq. (1). However, view synthesize is conventionally carried out by using two input textures with associated depth maps. For view interpolation one view is extrapolated from the left and one view is extrapolated from the right. Subsequently both views are blended to obtain the final rendered view. Thus, the distortion depends on two depth maps as given by $$D = f_D(\tilde{s}_{D,l}, \tilde{s}_{D,r}) \quad (10)$$

with $\tilde{s}D_{D,l}$ denoting the left depth map and $\tilde{s}_{D,r}$ denoting the right depth map. To compute D for view interpolation, the principle of assuming original depth data in parts of depth maps that have not been processed as done in eq. (9) can easily extended to two views. The formally defined renderer model as shown in FIG. 2 remains unchanged, except that the input additionally signalizes which of the two depth maps is altered. This allows the computation of the synthesized view distortion for arbitrary changes in both depth maps.

So far the renderer model has only been presented as formally defined state machine. In the following an overview of the basics ideas of the algorithm realizing the renderer model is given. Main objective of the algorithm is a computational low complex error calculation or state transition, hence a low complex re-rendering of parts of the synthesized view, that are affected by a depth change in one of the input depth maps.

As described above conventional view synthesis consists of multiple steps as e.g. warping of the input samples, interpolation at sub pixel positions, blending with a second view obtained similarly and hole filling. Typically these steps are realized as independent algorithms that are applied successively using the results of the previous step. However, to enable fast re-rendering of only parts of the synthesized view, the present concept integrates all steps to a single algorithm that can be applied pixel wise to the input depth map.

Figure 3:
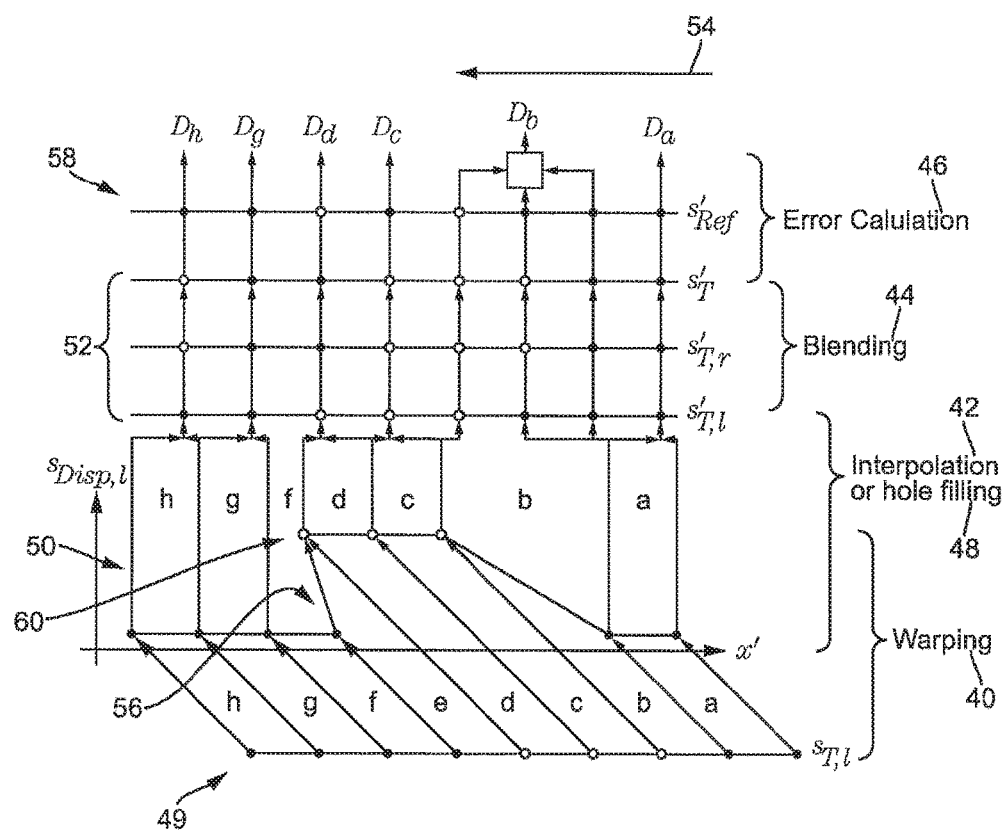
FIG. 3 shows an example for the dependencies between input, intermediate and output signals of the rendering or error calculation step.

How this is done is shown in the example give in FIG. 3. Rendering is applied row wise in a processing direction 54, hence all depicted signals represent one row of input, intermediate or output data. The single signals are from bottom to top: the left input texture $s_{T,l}$, i.e. the texture samples 49 of currently processed portion/block, for example, a x'-$s_{Disp,l}$ chart, i.e. the rendered texture samples 50 at sub-pel resolution, the texture synthesized from left $s_{T,l}'$, the texture synthesized from right $s_{T,r}'$, the blended texture $s_T'$, i.e. texture 52 as it would be obtained by a decoding side renderer 22—with or without blending and using two views—and the reference texture $s_{Ref}'$, i.e. the texture 58 as it would have been obtained by renderer 22 leaving the depth map unchanged, for example. The arrows denote the relationship between the single samples or sample positions of the signals. Dots shown in the x'-$s_{Disp,l}$ represent samples from the input view. Their horizontal position is equal to their position x' in the synthesized view. The vertical position shows their disparities. Since the depth is monotonically decreasing with the disparity, the topmost samples in the chart are the samples closest to the camera. Hence, it can be seen from the x'-$s_{Disp,l}$ chart which samples are occluded in the synthesized view.

Whereas a conventional view synthesis approach would carry out the single steps depicted from bottom to top for all samples in the intervals (a) to (g), the present concept supports interval wise processing. Hence, all steps are firstly conducted for interval (a) before continuing with interval (b). This approach yields two advantages. Firstly, re-rendering and error calculation can be carried out by iterating only one time over the input samples depth samples. Secondly, if only the view synthesis distortion should be calculated there is no need to store intermediate results.

To point out the key features of the approach re-rendering of some of the intervals shown in FIG. 3 is discussed in the following. The widths of the intervals in the input view are equal to the sampling distance. However, as can be seen in x'-$s_{Disp,l}$ the interval width can be stretched or compressed in the synthesized view.

For interval (a) first the left and the right boundary samples are shifted in the warping process 40, it can be seen from the x'-$s_{Disp,l}$ chart, that the shifted interval is not occluded. However, the left and right boundary samples have not been warped to full sample positions in the synthesized view. Hence, an interpolation 42 at the full sample position located between the two shifted boundary samples is carried out. To speed up this interpolation, the present concept maps a sample from an up-sampled version of the input texture to the interpolation position in the synthesized view $s_{T,l}'$. The exact position in the up-sampled view is derived from the distance of the interpolation position to the interval boundaries. After the interpolated sample value has been obtained, blending 44 with the sample at the same position in $s_{T,r}'$ is directly carried out to obtain the synthesized sample in $s_T'$. If the renderer model shall carry out a state transition, all intermediate results are stored and processing is for interval (a) is finished here. Otherwise, if the synthesized view distortion should be obtained only, intermediate results are not stored, but the algorithm continues with comparing the synthesized sample to the output view in error calculation step 46 which is part of calculation 32, resulting in the distortion $D_a$.

The width of the warped interval (b) is very large, hence a disocclusion can be assumed in the synthesized view. The two rightmost samples at integer positions in the shifted interval may be filled by background extrapolation or some other hold filling 48. The leftmost sample is close to the left interval border and it is assumed that it belongs to the foreground. Note, that these sample position might later be overwritten in the blending process 46, if the $s_{T,r}'$ has no disocclusions at the same positions.

Interval (f) is entirely occluded 56 in the synthesized view. This is detected by continuously memorizing the most left interval end 60 among the intervals processed so far and checking as to whether the current interval, here (f) lies to the right therefrom. Hence no further rendering or error calculation has to be carried out. As can be seen from the x'-$s_{Disp,l}$ chart the information that interval (f) is occlude can be derived from the positions of the interval boundaries, hence no complex z-buffering is required. To easily derive whether other samples left to interval (f) are occluded the rendering process stores the shifted position of the frontmost interval boundary of interval (f). This stored value can then be utilized for interval (e), to determine which parts of the interval are occluded.

To obtain the synthesized view distortion change related to the change of the depth map the single distortions $D_a$-$D_h$ related to the changed intervals a-h in the synthesized view are summed up. Moreover, and that is actually not depicted in FIG. 3, the old per-sample distortions of the changed interval are subtracted. Another aspect to be regarded is that in some cases not only the intervals related to the changed depth values are re-rendered, but some neighboring intervals as well. Reason for this is that neighbor intervals that are occluded before a depth change become visible after the depth change. The proposed algorithm detects such uncovering and continues rendering, until the complete changed interval in the synthesized view is updated.

Thus, in FIG. 3 the warping step 40 may be considered as the computation of a possible successor synthesis state determined by the warped positions 50 indicated with circles in FIG. 3. The possible successor synthesis state is, however, also determined by the result of steps 44, 42 and 48 leading to the synthesized texture samples $s_T'$. The error calculation 46 summing over the single distortions $D_a$-$D_h$ along with the not depicted, but above mentioned subtraction of the old error represents the calculation of the distortion change 32 in FIG. 2. If the possible successor synthesis state thus determined corresponds to the finally selected modified depth map, then the resulting warped sample position 50 along with s'$_T$ represent the new synthesis state for the next to be processed portion of the depth map, and this state transition is performed by function 30.

In this section it was shown how a distortion function can be defined providing a block related synthesized view distortion change. Moreover a state machine modeling the rendering process and an algorithm realizing this state machine have been presented. A detailed description of the modeled rendering process can be found in the section 1.2. Section 1.3 discusses how this rendering process can be extended to the renderer model.

1.1.2 Related Works

The usage of the synthesized view distortion in depth coding has been investigated by Kim et. al [4], [3] and Oh et al. [2]. In [4] an approximation of the synthesized view distortion is derived from comparing a texture block of the input view to a block consisting of samples shifted by the geometry error derived from the depth error. Furthermore an autoregressive model is provided that reduces the computational complexity of the approach. In [3] the synthesized view distortion is assumed to be proportional to the disparity error. The factor between synthesized view distortion and disparity error is derived globally or locally using a least square fit. The model presented in [2] utilizes a distortion function based on the local texture characteristics and the depth error in a multiplicative way. Moreover occlusion handling is regarded. However, none of the methods provides the correct view synthesis distortion or regards the blending process, as done by the renderer model.

1.2 Rendering Algorithm

Unlike other methods that estimate the distortion in synthesized views caused by a distortion of depth data the present concept computes the exact distortion change of the synthesized view using a simple rendering algorithm. Hence, effects of occlusions, disocclusions, blending and hole filling can be regarded. The applied rendering algorithm is described in this section. The algorithm is designed in a way that it can be easily extended to the renderer model. How this is done is explained in section 1.3.

The renderer allows view interpolation and view extrapolation. For the view interpolation case the input views need to be rectified. For view extrapolation and view interpolation the synthesized output texture of the renderer is rectified to the input view or views as well. Hence, apart from chroma up- and down-sampling steps, each row of the view to be synthesized can be processed independently.

For view extrapolation the synthesized texture $s_T'$ is rendered from an input texture $s_T$ and a corresponding input depth map $s_D$. Hence, the rendering process can be described as:

$$s_T' = f_R(s_T, s_D) \quad (11)$$

Figure 4:
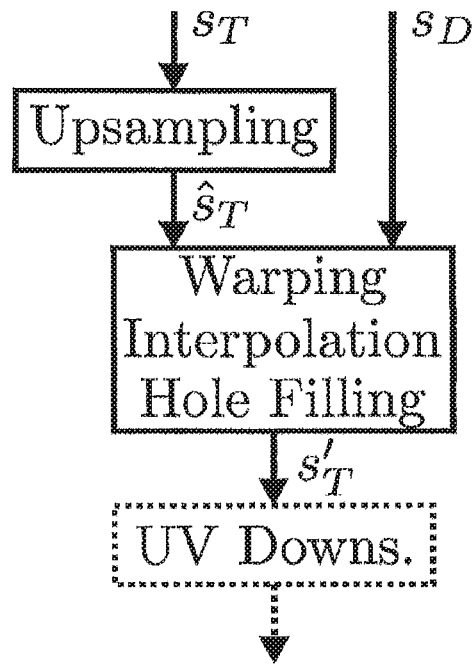
FIG. 4 shows basic steps of extrapolation of view $S'_T$ from one view $(s_T, s_D)$.

Signals in the warped domain are marked with an apostrophe (') in the following. The single steps of the view extrapolation are depicted in FIG. 4. First the input textures $s_T$ is up-sampled. Subsequently the up-sampled texture is warped to position of the view to extrapolate. The warping process is combined with interpolation and hole filling. Note that with interpolation, the interpolation at full sample positions in the synthesized view is meant here. If a chroma channel of the input texture with a lower resolution than the luma channel should be rendered, its sampling rate is increased to the luma sampling rate in the up-sampling step.

After warping, interpolation and hole filling the chroma component can be optionally reduced to its original sampling rate.

When conducting view interpolation the synthesized texture $s_T'$ is rendered from a left and right input textures $s_{T,l}$ and $s_{T,r}$ as well as corresponding left and right depth maps $s_{D,l}$ and $s_{D,r}$:

$$s_T' = f_R(s_{T,l}, s_{T,r}, s_{D,l}, s_{D,r}) \quad (12)$$

In the following symbols denoting signals of the left or right view contain l or r.

Figure 5:
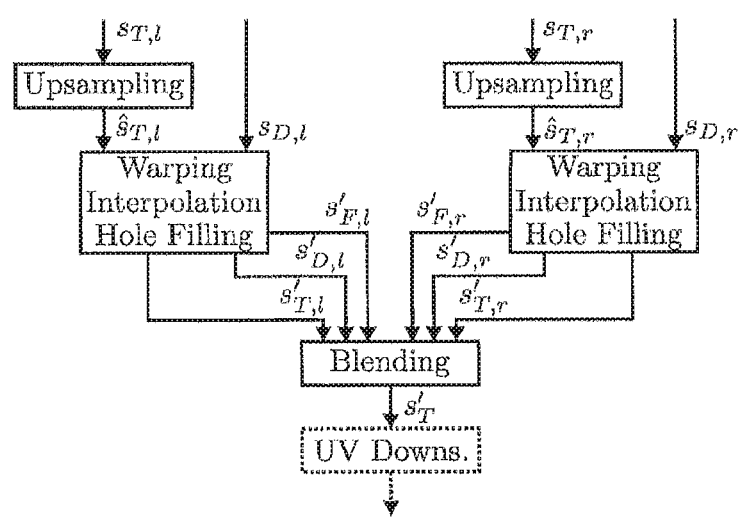
FIG. 5 Basic steps of interpolation of intermediate view $s'_T$ from a left view $(s_{T,l}, s_{D,l})$ and a right view $(s_{T,r}, s_{D,r})$.

The view interpolation process is depicted in FIG. 5. It can be seen that view interpolation is carried out by first extrapolating a texture $s_{T,l}'$ from the left view and a texture $s_{T,r}'$ from the right view to the position of the view to be synthesized. These two textures are combined by blending to create the synthesized output textures $s_T'$. For blending additional signals are needed that are produced in the warping, interpolation and hole filling process as well. These signals are the warped depth maps $s_{D,l}'$ and $s_{D,r}'$ and the filled maps $s_{F,l}'$ and $s_{F,r}'$.

Note that also depicted as independent step, blending is carried out instantly in the warping, interpolation and hole filling process to reduce computational complexity. This means if e.g. $s_{T,l}'(x)$ has already been rendered, $s_T'(x)$ is can directly be computed in the interpolating and hole filling process of the right view after $s_{T,r}'(x)$ has been obtained. In the next sections the processing steps used for rendering are discussed in detail.

1.2.1 Up-Sampling

Up-sampling is conducted to enable sub-pixel accurate warping. The luma component of the input texture signal $s_T$ is up-sampled by a factor of four in horizontal direction, using the same sampling filters as in the HM software version 3.0 described in [5] which serves as an example for a typical hybrid block-based multi-view encoder including depth map encoding, here a HEVC codec with multi-view coding capability including depth map encoding. [5] is incorporated herein by reference for details regarding the encoding and optimization procedure. Interpolation filters are given in table 1. The up-sampled signal is denoted as $\hat{s}_T$.

TABLE 1

| Luma upsampling filter from HM software version 3.0 [5] | | | | | | | | | |
|---|---|---|---|---|---|---|---|---|---|
| Position | Cf. 0 | Cf. 1 | Cf. 2 | Cf. 3 | Cf. 4 | Cf. 5 | Cf. 6 | Cf. 7 | Div |
| 1/4 | −1 | 4 | −10 | 57 | 19 | −7 | 3 | −1 | 64 |
| 2/4 | −1 | 4 | −11 | 40 | 40 | −11 | 4 | −1 | 64 |
| 3/4 | −1 | 3 | −7 | 19 | 57 | −10 | 4 | −1 | 64 |

To avoid down-sampling of depth data in the warping process and to simplify the rendering process chorma components are up-sampled to the luma sampling rate. For 4:2:0 data the vertical sampling rate is increased by a factor of two and the horizontal sampling rate by a factor of eight. This approach allows to process the chroma channels in the same way as the luma channel. Interpolation filter coefficients are also taken from HM software version 3.0 [5] and are shown in table 2.

TABLE 2

| Chroma up-sampling filter from HM software [5] | | | | | |
|---|---|---|---|---|---|
| Position | Cf. 0 | Cf. 1 | Cf. 2 | Cf. 3 | Div |
| 1/8 | −3 | 60 | 8 | −1 | 64 |
| 2/8 | −4 | 54 | 16 | −2 | 64 |

TABLE 2-continued

Chroma up-sampling filter from HM software [5]

| Position | Cf. 0 | Cf. 1 | Cf. 2 | Cf. 3 | Div |
|---|---|---|---|---|---|
| 3/8 | −5 | 46 | 27 | −4 | 64 |
| 4/8 | −4 | 36 | 36 | −4 | 64 |
| 5/8 | −4 | 27 | 46 | −5 | 64 |
| 6/8 | −2 | 16 | 54 | −4 | 64 |
| 7/8 | −1 | 8 | 60 | −3 | 64 |

1.2.2 Warping, Interpolation and Hole Filling

In this section only the warping 40 of a left input view to the right is presented. Warping from right to left can be achieved by reversing all directions. To increase the processing speed hole filling 48 and interpolation 42 is integrated in the warping process 40. However, hole positions are marked with 0 in the binary filled map $s_F'$ as not filled by warping. The filled map $s_F'$ is used for blending later.

Figure 6:
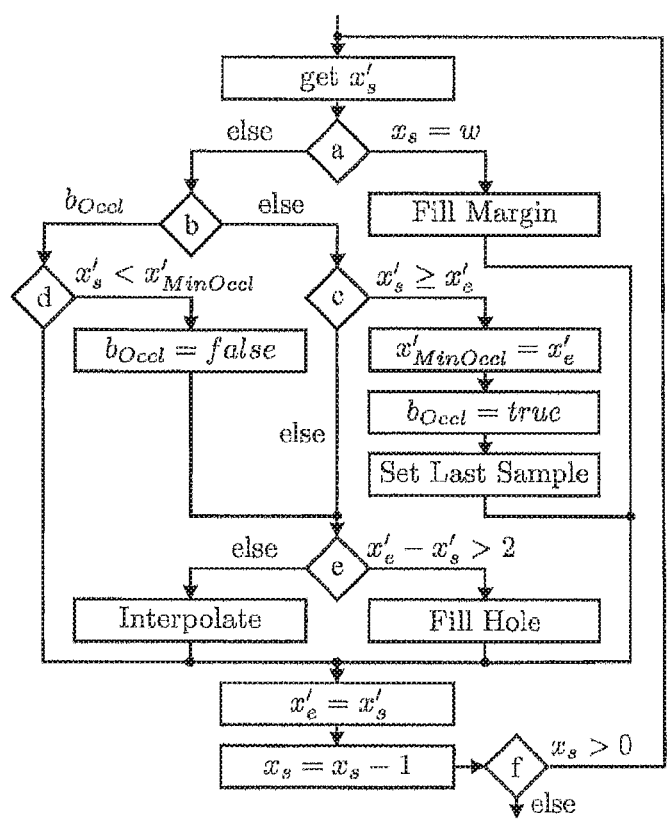
FIG. 6 shows a flow chart of one iteration of the warping and instant interpolation and hole filling process.

A flow chart of the warping, interpolation and hole filling process is given in FIG. 6. Rendering is conducted row-wise, hence the depicted process is applied to each row of the input view independently. The shown steps are carried out for each sample $s_D(x_s)$ of an input depth row from right to left. Hence, processing is conducted iterating from sample position $x_s=w$ to sample position $x_s=1$. w denotes input image width in samples.

Basic idea of the warping, interpolation and hole filling process is that rendering of a row is carried out interval wise. In each iteration an interval of the row to be synthesized reaching from $x_s'$ to $x_e'$ is rendered. $x_s'$ and $x_e'$ are obtained by shifting two subsequent samples at positions $x_s$ and $x_e = x_s + 1$ from the input view. Hence, the interval in synthesized view corresponds to the interval starting at $x_s$ and ending at $x_e$ in the input view. The interval in the synthesized view is called shifted interval in the following.
Shifting is carried out using $$x' = f_s(x) = x - s_{Disp}(x) \quad (13)$$

with $s_{Disp}$ denoting the actual disparity. From 8-bit input depth data $s_D$ in a format as for example used by MPEG [6] the disparity $s_{Disp}$ can be retrieved by $$s_{Disp}(x) = f \cdot x_B \cdot \left[ \frac{s_D(x)}{255} \cdot \left( \frac{1}{z_{near}} - \frac{1}{z_{far}} \right) + \frac{1}{z_{far}} \right] + x_{doff} \quad (14)$$

with f denoting the focal length of the cameras, $x_B$ the baseline of the camera pair, and $z_{near}$ and $z_{far}$ the minimal and maximal depth of the depicted scene. $x_{doff}$ is the difference of the offsets between the stereo cameras optical axes and cameras image origins. In the practical implementation of the renderer eq. (14) is evaluated for all possible $2^8$ input values of $s_D$. Results are stored with quarter sample accuracy in a disparity lookup table that is used for the mapping from $s_D$ to $s_{Disp}$ in the warping process.

In the first step shown in FIG. 6 the shifted position $x_s'$ is computed using eq. (13). After that it is tested (a) if the current sample is the last sample position of the input views $x_s=w$. If this is true the right margin of the view to synthesize is filled as described in section 1.2.2.2. Subsequently the current shifted position $x_s'$ is stored as last shifted position $x_e'$ and the current position $x_s$ is decreased by one and processing continues with the next interval.

Figure 7:
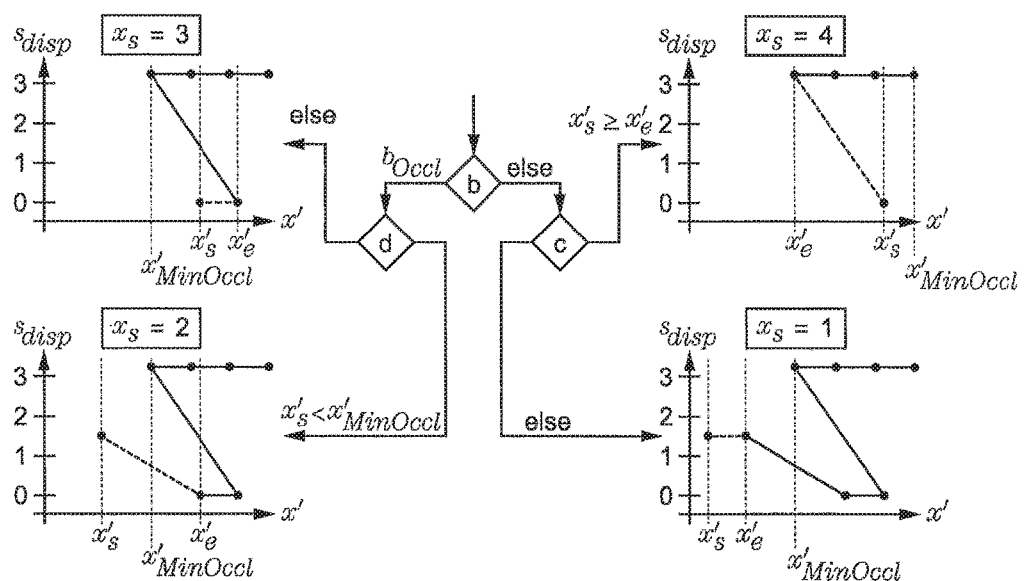
FIG. 7 shows scenarios for rendering the shifted interval related to the flow chart in FIG. 6.

If $x_s$ is not the last position in the input view $x_s'$ a and $x_c'$ provide a shifted interval. It is further investigated if this shifted interval is not, partly or entirely occluded. Therefore conditions marked with (b), (c) and (d) are evaluated. The result of the evaluation determines how processing is continued. All four possible scenarios are depicted as $x'$-$s_{Disp}$ charts in FIG. 7. The four possible scenarios are:

$b_{Occl}$=false and $x_s' \geq x_c'$ ($x_s=4$) The Boolean $b_{Occl}$ signalizes that the last shifted interval is not occluded. However, the sample from position $x_s$ has been shifted to or right to $x_e'$. Hence the samples of the shifted interval are occluded. $x_e'$ is the leftmost shifted position that is occluding other positions and stored as new minimal occluded position $x_{MinOccl}'$. Moreover $b_{Occl}$ is set to true and it is checked, if the sample of the output view near position $x_e'$ belongs to the foreground as described in section 1.2.2.3.

$b_{Occl}$=true and $x_s' \geq x_{MinOccl}'$ ($x_s=3$) No rendering or hole filling is carried out since the whole shifted interval is occluded.

$b_{Occl}$=true and $x_s' < x_{MinOccl}'$ ($x_s=2$) The start of the shifted interval is no longer occluded. $b_{Occl}$ is set to false. Interpolation or hole-filling is carried out for the non-occluded part of the shifted interval.

$b_{Occl}$=false and $x_s' > x_e'$ ($x_s=1$) The whole shifted interval is not occluded. Hence, interpolation or hole filling is carried out.

Whether rendering or hole filling is performed for the non-occluded part of a shifted interval depends on the size of the interval (e). By definition rendering is conducted for intervals with a size $x_e'$-$x_s' \leq 2$. The threshold of 2 has been found empirically. Interpolation of an interval is described in section 1.2.2.1. An explanation of the hole filling process is given in section 1.2.2.4.

1.2.2.1 Interpolation of a Shifted Interval

In this step all not occluded samples of the current row of synthesized view $s_T'$ in between the start position $x_s'$ and the end position $x_e'$ of the shifted interval are rendered. The shifted interval corresponds to an interval with start point $x_s$ and endpoint $x_e$ in the input view $s_T$ and an interval with start point $4 \cdot x_s$ and endpoint $4 \cdot x_c$ in the up-sampled texture view $\hat{s}_T$. Since $s_{Disp}$ is calculated with quarter sample accuracy using equation eq. (13) $x_s'$ and $x_e'$ are given in quarter sample accuracy as well and are mapped to the full sample grid of the synthesized view $s_T'$. This mapping is conducted by using $$x_{s,FP}' = \text{ceil}(x_s') \quad (15)$$

with $x_{s,FP}'$ defining the first sample position in full pel accuracy to be interpolated and $$x_{e,FP}' = \min[\text{ceil}(x_e') - 1, \text{round}(x_{MinOccl}') - 1] \quad (16)$$

for the last sample position in full sample accuracy to be interpolated. The term ceil($x_c'$)−1 in eq. (16) fits $x_{s,FP}'$ to the start of previously rendered interval right to the current interval. Taking the minimum of this term and round($x_{MinOccl}'$)−1 ensures that no occluded samples are re-rendered again.

After the mapping all sample values for all full sample positions $x_{FP}'$ from $x_{s,FP}'$ to $x_{e,FP}'$ can be assigned by sample values given in the up sampled view $\hat{s}_T$. Positions in the up-sampled view can be retrieved by mapping the positions from the synthesized view $s_T'$ to the up-sampled view $\hat{s}_T$ using $$\hat{x} = 4 \cdot \left( \frac{x_{FP}' - x_s'}{x_e' - x_s'} + x_s \right) \quad (17)$$

$$s_{T,l}'(x_{FP}') = \hat{s}_{T,l}(\hat{x})$$

In the implementation of the renderer this process can be speed up using a look-up table for the fraction in eq. (17). This is possible since the distance between $x_s'$ and $x_e'$ is limited to two. The look-up table for quarter sample accuracy is depicted in table 3. Results are rounded to quarter sample accuracy as given in $s_{T,l}'$.

TABLE 3

Look-up table realizing the fraction in eq.17 with quarter sample precision

|  |  | \multicolumn{9}{c}{$x'_{FP} - x'_s$} |
| --- | --- | --- | --- | --- | --- | --- | --- | --- | --- | --- |
|  |  | 0 | 0.25 | 0.5 | 0.75 | 1 | 1.25 | 1.5 | 1.75 | 2 |
| $x'_e -$ | 0 | 0 | x | x | x | x | x | x | x | x |
| $x'_s$ | 0.25 | 0 | 1 | x | x | x | x | x | x | x |
|  | 0.5 | 0 | 0.5 | 1 | x | x | x | x | x | x |
|  | 0.75 | 0 | 0.25 | 0.5 | 1 | x | x | x | x | x |
|  | 1 | 0 | 0.25 | 0.5 | 0.75 | 1 | x | x | x | x |
|  | 1.25 | 0 | 0.25 | 0.5 | 0.5 | 0.75 | 1 | x | x | x |
|  | 1.5 | 0 | 0.25 | 0.25 | 0.5 | 0.75 | 0.75 | 1 | x | x |
|  | 1.75 | 0 | 0.25 | 0.25 | 0.5 | 0.5 | 0.75 | 0.75 | 1 | x |
|  | 2 | 0 | 0.25 | 0.25 | 0.5 | 0.5 | 0.75 | 0.75 | 1 | 1 |

In the case of view interpolation the synthesized depth and the filled map is needed when blending. Therefore all samples for all samples $x_{FP}'$ from $x_{s,FP}'$ to $x_{e,FP}'$ are also set in the synthesized depth view $s'_{D,l}$ and the filled map $s'_{F,l}$:

$$s_{D,l}'(x_{FP}')=s_{D,l}(x_s)$$

$$s_{F,l}'(x_{FP}')=1 \quad (18)$$

It can be seen that from eq. (18) that only full sample accuracy is used for the synthesized depth map.

1.2.2.2 Margin Filling

When extrapolating from a left view to the right information on the right margin of the synthesized view is missing. The renderer extrapolates sample values at these positions by continuing the rightmost sample value of the left view by setting $$s_{T,l}'(x_{FP}')=s_{T,l}(x_e)=\tilde{s}_{T,l}(4 \cdot x_e)$$

$$s_{D,l}'(x_{FP}')=s_{D,l}(x_e) \quad (19)$$

for all samples $x_{FP}'$ from $x_{s,FP}'$ to w. Moreover the position $x_{s,FP}'$ is marked as filled by warping in the filled map $s_F'(x_{c,FP}')=1$ and samples $x_{FP}'$ from $x_{s,FP}'+1$ to w are marked as not filled by warping $s_F'(x_{FP}')=0$.

1.2.2.3 Extrapolation of Samples Near to Foreground Object

Occlusions appear in the warping process when samples are shifted behind a foreground object. When rendering from left to right this happens if the start of the shifted interval is greater or equal to its end $x_s' \geq x_e'$. In this case it may be evaluated whether $x_{c,FP}'$ belongs to the foreground object or not. Therefore the condition $$x_{e,FP}'=\text{round}(x_e') \quad (20)$$

is tested. The correctly rounded leftmost position of the foreground object is round($x_e'$). Hence $x_{e,FP}'$ belongs to the foreground if eq. (20) is true and $$s_{T,l}'(x_{e,FP}')=s_{T,l}(x_e)=\tilde{s}_{T,l}(4 \cdot x_e)$$

$$s_{D,l}'(x_{e,FP}')=s_{D,l}(x_e) \quad (21)$$

$$s_{F,l}'(x_{e,FP}')==1$$

are set.

1.2.2.4 Hole Filling

If the width of the shifted interval $x_e'-x_s'$ is greater than 2 a hole next to the right side of a foreground object is assumed. Similar to evaluation on left foreground object edges as described in section 1.2.2.3, it is examined if $x_{s,FP}'$ belongs to the right foreground object edge. If $x_{s,FP}'=$round $(x_s')$ this is true and output variables are set according to $$s_{T,l}'(x_{s,FP}')=s_{T,l}(x_s)=\tilde{s}_{T,l}(4 \cdot x_s)$$

$$s_{D,l}'(x_{s,FP}')=s_{D,l}(x_s) \quad (22)$$

$$s_{F,l}'(x_{s,FP}')=1$$

After that hole filling is carried out by extrapolating the background sample for all $x_{FP}'$ starting from or $x_{s,FP}'$ or $x_{s,FP}'+1$ if $x_{s,FP}'$ belongs to the foreground object to $x_{e,FP}'$. Therefore output variables are set as follows:

$$s_{D,l}'(x_{FP}')=s_{D,l}(x_e)=\tilde{s}_{T,l}(4 \cdot x_e)$$

$$s_{T,l}'(x_{FP}')=s_{T,l}(x_e) \quad (23)$$

$$s_{F,l}'(x_{FP}')=0$$

1.2.3 Blending

If view interpolation is carried out as depicted in FIG. 5, a texture extrapolated from lefts $s_{T,l}'$ and a texture extrapolated from right $s_{T,r}'$ are blended to create the output synthesized view $s_T'$. Additional inputs to blending function are the two synthesized depth maps $s_{D,l}'$ and $s_{T,r}'$ and the two filled maps $s_{F,l}'$ and $s_{F,r}'$.

Since blending is a point operation, instant blending can be carried out. This means when the sample at position $x=x_c$ with the value $s_{T,r}'(x_c)$ is rendered in the view extrapolation process of the right view, $s_T'(x_c)$ can directly derived if $s_{T,l}'(x_c)$ is already known and vice versa.

The renderer provides two modes for blending. In the first mode applies blending using average. This mode uses information from both synthesized views equally. In the second mode information from one view is used mainly. The other view is only used for areas that have not been filled by interpolated samples in the first view.

1.2.3.1 Blending Using Average

Blending is carried out similar to [7], [8] using a distance dependent weighting factor and a decision for the front most sample if a particular depth-difference threshold is exceeded.

Table 4 gives an overview how the value in the synthesized texture $s_T'$ is derived from the synthesized textures $s_{T,l}'$ and $s_{T,r}'$. The last column in the table 4 indicates whether $s_T'(x')$ is assigned by $s_{T,l}'(x')$ or $s_{T,r}'(x')$ or if distance dependent weighting is performed using $$s_T'(x')=s_{T,l}'(x')+[s_{T,r}'(x')-s_{T,l}'(x')] \cdot \frac{x_{SV}-x_{RV}}{x_{LV}-x_{RV}} \quad (24)$$

with $x_{sv}$ denoting the horizontal position of the synthesized view and $x_{LV}$ and $x_{RV}$ denoting the position of the left and the right base view. The distance dependent weighting enables a soft transition of the synthesized views from the left base view to the right base view.

As shown in table 4 the method for blending depends on the filled maps $s_{F,l}'(x')$ and $s_{F,r}'(x')$ as well as on the inverse depth difference b derived from the depth values $s_{Z,l}'(x')$ and $s_{Z,r}'(x')$. The inverse depth values can be calculated from the synthesized input depth values using $$\frac{1}{s_Z'(x')}=\frac{s_D'(x')}{255} \cdot \left(\frac{1}{z_{near}}-\frac{1}{z_{far}}\right)+\frac{1}{z_{far}}. \quad (25)$$

If the sample value rendered from left $s_{T,l}'(x')$ and the view rendered from right $s_{T,r}'(x')$ are not derived by hole filling as indicated by $s_{F,l}'(x')=1$ and $s_{F,r}'(x')=1$ the difference of inverse depth $$b(x') = \frac{1}{s'_{Z,l}(x')} - \frac{1}{s'_{Z,r}(x')} \quad (26)$$

is evaluated.

In the case that absolute value of difference b(x') is below a threshold $b_{th}$ view distance dependent blending is carried out as presented in eq. (24). Otherwise it is assumed that the value of the view in the background is unreliable and the foreground sample value is take for the rendered texture $s_T'(x')$. The threshold $b_{th}$ has been set empirically to $$b_{th} = 0.3 \cdot \max\left[\left(\frac{1}{z_{near,l}} - \frac{1}{z_{far,l}}\right) \cdot \left(\frac{1}{z_{near,r}} - \frac{1}{z_{far,r}}\right)\right] \quad (27)$$

If only $s_{T,l}'(x')$ or $s_{T,r}'(x')$ has been assigned by hole filling, the value of the other view is used in the rendered texture $s_T'(x')$ as shown in rows five and six of table 4. If $s_{T,l}'(x')$ as well as $s_{T,r}'(x')$ have been derived by hole filling there is a disocclusion in both views and the extrapolated value of the view in the background is taken for $s_T'(x')$.

TABLE 4

Output sample of $s'_T$ depending on filled maps and inverse depth difference

| $s'_{F,l}$ | $s'_{F,r}$ | $|b| < b_{th}$ | $b < 0$ | $s'_T$ |
|---|---|---|---|---|
| 1 | 1 | 1 | DC | Blending |
| 1 | 1 | 0 | 0 | $s'_{T,l}$ |
| 1 | 1 | 0 | 1 | $s'_{T,r}$ |
| 1 | 0 | DC | DC | $s'_{T,l}$ |
| 0 | 1 | DC | DC | $s'_{T,r}$ |
| 0 | 0 | DC | 0 | $s'_{T,r}$ |
| 0 | 0 | DC | 1 | $s'_{T,l}$ |

1.2.3.2 Blending Using Mainly One View

Table 5 gives an overview how the value in the synthesized texture $s_T'(x')$ is derived from the synthesized textures $s_{T,l}'(x')$ and $s_{T,r}'(x')$ when mainly blending from the left view.

TABLE 5

Output sample of $s'_T$

| $s'_{F,l}$ | $s'_{F,r}$ | $s'_T$ |
|---|---|---|
| 1 | 1 | $s'_{T,l}$ |
| 1 | 0 | $s'_{T,l}$ |
| 0 | 1 | $s'_{T,r}$ |
| 0 | 0 | $s'_{T,l}$ |

Sample values from the view rendered from right $s_{T,r}'$ are only taken when a disocclusion occurs in the left synthesized view.

1.2.4 Down-Sampling of Chroma Channels

The last step of processing the conversion from 4:4:4-yuv format used for rendering back to 4:2:0 yuv-format. The coefficients of the filter used before down-sampling the color planes by a factor of two in horizontal and vertical direction are presented in table 6.

TABLE 6

Chroma down sampling filter

| Cf. 0 | Cf. 1 | Cf. 2 | Div |
|---|---|---|---|
| 1 | 2 | 1 | 4 |

Note that this step is optionally. For the error calculation using the renderer model as described in section 1.3, this step is neglected.

1.3 Renderer Model

This section presents how the renderer proposed in section 1.2 can be extended to the renderer model used for the computation of the synthesized view distortion change. Therefore the single building blocks defining the renderer model, as input, output, state, state transition function and output function are discussed. Subsequently it is shown how the renderer model can be used for multiple input depth maps and multiple synthesized views.

1.3.1 State

The state of the renderer model is defined by the variables given in table 7. Additionally to new variables $s_{O,l}$ and $s_{O,r}$ are used. $s_{O,l}$ and $s_{O,r}$ are binary maps tracking the occluded input sample. This means $s_O(x)$ is 1 when the shifted position of the input sample at x is occluded by other warped samples. The occlusion maps are needed to recover the variables $x_{MinOccl}'$ and $b_{Occl}$ that are used in the rendering process as described in section 1.2.

$x_{MinOccl}'$ and $b_{Occl}$ as well as $x_{MinChg}$ do not define the state of the renderer model, but are only auxiliary variables used in the rendering process. The same comes true for input textures $s_{T,l}$, $s_{T,r}$ and the reference view $s_{Ref}'$ since these signals are constant and not altered by state transitions. The state space of the renderer is spanned by all elements of the variables given in table 7. Note that this state space could be reduced to $s_{D,l}$ and $s_{D,r}$, all other state variables are only used to enable fast re-rendering. Due to the finite number of quantization steps for the state variables the renderer can be modeled as finite state machine.

TABLE 7

Variables defining the state of the renderer model

| Left View | Right View | Both Views | |
|---|---|---|---|
| $s_{D,l}$ | $s_{D,r}$ | | Input Depth |
| $s_{O,l}$ | $s_{O,r}$ | | Occlusion Map |
| $s'_{D,l}$ | $s'_{D,r}$ | | Synthesized Depth |
| $s'_{T,l}$ | $s'_{T,r}$ | $s'_T$ | Synthesized Texture |
| $s'_{F,l}$ | $s'_{F,r}$ | | Filled Map |

1.3.2 Input

The input to render model is defined as show in eq. (28).

$$(t, v, x_{B,s}, x_{B,e}, y_{B,s}, y_{B,e}, \tilde{s}_B) \quad (28)$$

t is the input type. The other variables in eq. (28) specify a block B in one of the depth map $s_{D,l}$ and $s_{D,r}$. v indicates if the block is in the left or the right view. $x_{B,s}$ and $x_{B,e}$ are the horizontal start and endpoint of the block. The vertical start and endpoints are denoted by $y_{B,s}$ and $y_{B,e}$. $\tilde{s}_B$ is a signal of size $(x_{B,e}-x_{B,s}+1) \cdot (y_{B,e}-y_{B,s}+1)$ carrying the new depth data of the block.

The renderer model supports two types inputs t to provide two different functionalities. For the first input type the change of the synthesized distortion that would be obtained by a change of the specified block B is given as output. In the process the renderer state remains unchanged. This mode is particularly useful when multiple changes to the model should be evaluated before choosing one, as e.g. done in rate distortion optimization. How the distortion change is calculated is given in sec. 1.3.4.

If the second input type is given the renderer model is adapted to the change of block B by carrying out a state transition as presented in the next section. No output is produced.

1.3.3 State Transition

A state transition is conducted to adopt the change of the block B given in the input. Within a transition the samples of a block of the left input depth map $s_{D,l}$ or the right depth map $s_{D,r}$ are changed to $\bar{s}_{D,l}$ or $\bar{s}_{D,r}$. As consequence the state variables are modified resulting in a new synthesized texture $\tilde{s}_T'$. As before for the renderer, only a change of the left depth data $s_{D,l}$ is discussed here.

The state transition algorithm consists of four parts: All four parts of the algorithm that are successively applied to each row y of the input block B starting with $y_{B,s}$ and ending with $y_{B,e}$.

1.3.3.1 Recovery of Auxiliary Variables

As presented in section 1.2.2 the rendering process uses the auxiliary variables $x_{MinOccl}'$ to track the position of the leftmost sample that is occluding other samples and $b_{Occl}$ to find out if the last shifted sample position has been occluded. When rendering a complete row of the synthesized texture $s_T'$ these variables are continuously updated after initialization at the right margin of the image x=w. If only a row of the block B ending at $x_{B,e}$ should be re-rendered $x_{MinOccl}'$ and $b_{Occl}$ are unknown and may be recovered from the render model state.

Figure 8:
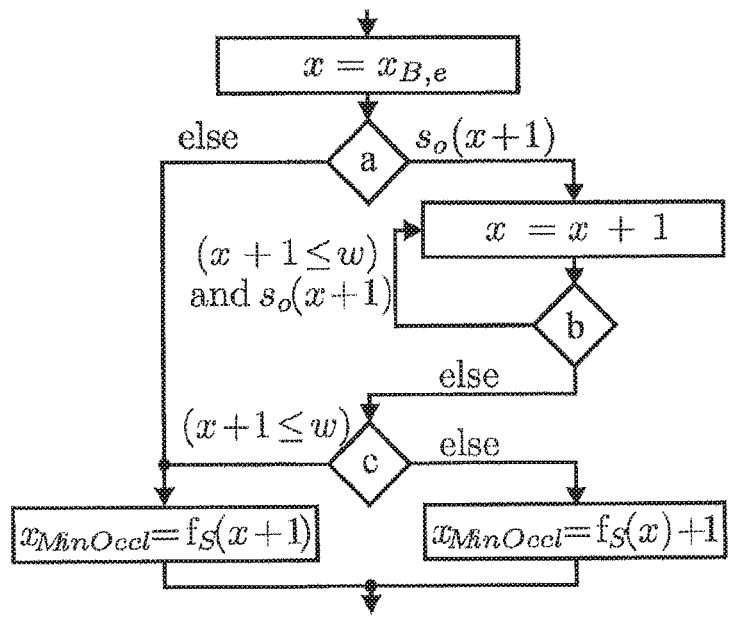
FIG. 8 shows a flow chart of for the recovery of the auxiliary variable $x'_{MinOcci}$.

The flow chart in FIG. 8 depicts the recovery algorithm for $x_{MinOccl}'$ that is used in the case that the end position of the block $x_{B,e}$ is less than the image width w. For $x_{B,e}=w$ the normal initialization of $x_{MinOccl}'$ and $b_{Occl}$ is applied. It can be seen in FIG. 8 that the algorithm uses the occluded samples map $s_O$. As stated before $s_O(x)$ is true for samples at positions x that are shifted to a position $x'=f_s(x)$ that is occluded by other warped samples.

The recovery algorithm utilizes the variable x to perform the search for $x_{MinOccl}'$. Therefore x is set to the end position $x_{B,e}$ of block B in the first step. After that it is checked if the sample $x_{B,c}+1$ right to $x_{B,e}$ is occluded.

If $f_s(x_{B,e}+1)$ is not occluded, indicated by $s_O(x_{B,e}+1)=0$ none of the samples right to $x_{B,e}+1$ are shifted left to $f_s(x_{B,e}+1)$, since that would had implied the occlusion of $f_s(x_{B,e}+1)$. Hence $x_{MinOccl}'$ can be set to the shifted position $f_s(x_{B,e}+1)$.

Figure 9:
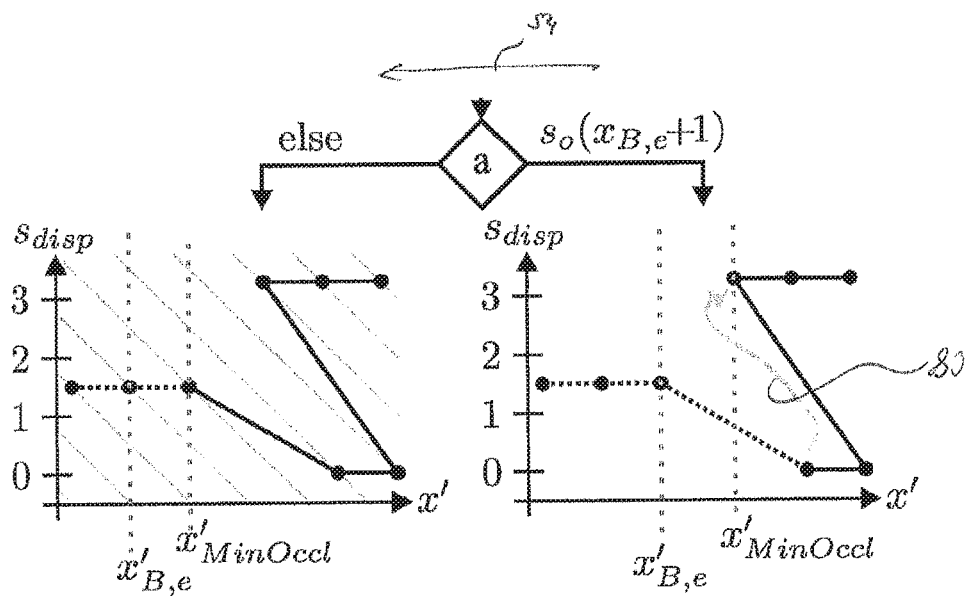
FIG. 9 shows an example for recovery of the auxiliary variable $x'_{MinOcci}$.

Note that $x_{MinOccl}'$ might be greater than $f_s(x_{B,e}+1)$ in the case that rendering algorithm starts at sample position w. However, to guarantee a proper transition it is sufficient if rendering from $x=x_{B,e}$ to x=1 produces the same state as rendering from x=w to x=1. And this is actually given when setting $x_{MinOccl}'=f_s(x_{B,e}+1)$. As proven in section 3.1 samples left to $x_{B,e}+1$ that are shifted to or right to $f_s(x_{B,e}+1)$ are anyway occluded. Hence the re-rendering of the row of block B does not depend on $x_{MinOccl}'$ for $x_{MinOccl}'\geq f_s(x_{B,e}+1)$ if $f_s(x_{B,e}+1)$ is not occluded. An example for that is depicted in FIG. 9 on the left side. It can be seen from the $x'$-$s_{Disp}$ chart that $x_{MinOccl}'$ is less than the "real" $x_{MinOccl}'$ defined by the leftmost sample of the foreground object. However, due to the relationship from eq. (13) samples can only move on the diagonal lines shown in the chart. Hence all samples of the changed interval that are shifted right to $x_{MinOccl}'$ are occluded.

If the evaluation (a) depicted in FIG. 8 shows that the sample at position $f_s(x_{B,c}+1)$ is occluded, some samples right to $x_{B,c}+1$ might occlude positions left to $f_s(x_{B,e}+1)$ and a search for minimal occluded position is carried out. Therefore x is incremented while $f_s(x+1)$ is occluded as signaled by $s_O(x+1)=1$ and the right end of the input data has not been reached $x+1\leq w$. Subsequently $x_{MinOccl}'$ is derived from the found position x. An example for this shown in FIG. 9.

In the case that the position x+1 right to the found position x is within the input image $x+1\leq w$ the minimal occluded position $x_{MinOccl}'$ is set to $f_s(x+1)$. Since the sample at x+1 is not occluded, samples right to x+1 can occluded samples left to $f_s(x+1)$. If the found position x is equal to the last position in the input image w $x_{MinOccl}'$ is set one quarter sample left to the position left to the shifted position $f_s(w)$ as it is done in the normal initialization process of the renderer.

$b_{Occl}$ can be set to true if $x_{B,c} \geq x_{MinOccl}'$ after the recovery of $x_{MinOccl}'$. When multiple error calculations related to the same block are carried out successively, the recovery process may only be carried out once before the first calculation.

That is, referring to FIG. 9, in processing the intervals (dotted lines) between the pairs of warped texture samples (circles connected by dotted lines), warped from the texture samples of the currently processed portion, occlusions 56 (see FIG. 3) or 80 among the warped texture samples 50 and the intervals (solid lines) between warped texture samples (circles connected by solid lines), warped from texture samples of the second view neighboring the currently processed portion along the processing direction, are discovered by continuously updating a first farthest—in processing direction 54—extension end (see 60 in FIG. 3) of previously processed intervals among the dashed ones, searching a second farthest—in processing direction (54)—extension end (see Fig. $x_{MinOccl}'$) of the intervals (solid lines) between pairs of warped texture samples, warped (40) from a pair of the texture samples ($s_T$) of the yet to be processed portions neighboring the current portion in a direction opposite to the processing direction, and detecting occluded positions of a currently processed interval in case of same lying upstream relative to the first or second farthest extension in processing direction 54.

1.3.3.2 Rendering of New Data

To minimize computational complexity when re-rendering data from $\bar{s}_{D,l}$ of a row within the block B it is useful to know the start $x_{CT,s}'$ and the end point of the changed interval $x_{CT,e}'$ in the synthesized texture. This changed interval not only depends on the new data $\bar{s}_{D,l}$ but also on the old data $s_{D,l}$ within the block B.

The rendering of the new data $\tilde{s}_{D,l}$ from $x_{B,s}$ to $x_{B,e}$ affects the synthesized view $s_T'$ from $\tilde{x}_{C,s}'$ to $\tilde{x}_{C,e}'$. As described in section 1.2.2 some samples can be shifted into occluded areas and the sample order in the input and in the synthesized domain can differ. Therefore it is not sufficient to only shift the start $x_{B,s}$ and the end $x_{B,e}$ of the input interval. All samples x reaching from $x_{B,s}$ to $x_{B,e}+1$ are evaluated to find $\tilde{x}_{C,s}'$ and $\tilde{s}_{C,e}'$ using $$\tilde{x}_{C,s}' \min[f_s(x,\tilde{s}_{D,l})]$$

$$\tilde{x}_{C,e}' \max[f_s(x,\tilde{s}_{D,l})] \quad (29)$$

The last evaluated position in the equations above is $x_{B,e}+1$ and not $x_{B,e}$, since the rendering is conducted interval wise and the last interval is defined as reaching from $x_s=x_{B,e}$ to $x_e=x_{B,c}+1$. Similarly rendering using the old data of $s_{D,l}$ from the same input interval, results in the output interval from $x_{C,s}'$ to $x_{C,e}'$.

Start and endpoints of the old and new shifted interval can be combined to derive the start $x_{CT,s}'$ and endpoint $x_{CT,c}'$ of changed interval in the synthesized domain by $$\tilde{x}_{CT,s}'\text{min}(x_{C,s}',\tilde{x}_{C,s})$$

$$\tilde{x}_{CT,e}'\text{max}(x_{C,e}',\tilde{x}_{C,e}) \quad (29)$$

However, $x_{CT,e}'$ can be further limited, since samples of B that are shifted right to $f_s(x_{B,c}+1,s_{D,l})$ are occluded as proven in section 3.1. These sample do not need to be re rendered and $x_{CT,e}'$ can be set to $f_s(x_{B,c}+1,s_{D,l})$.

Figure 10:
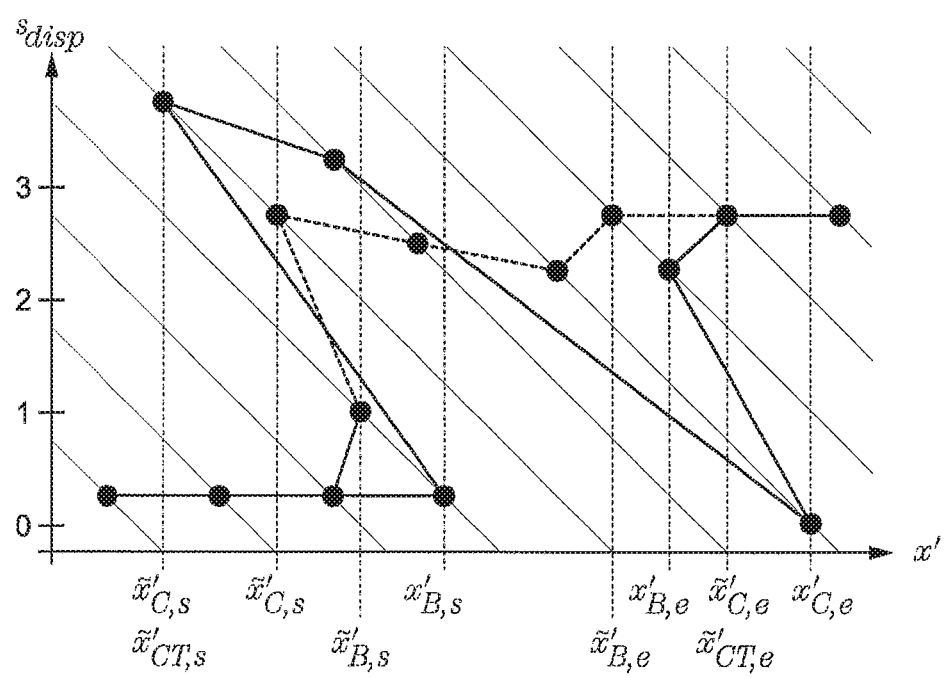
FIG. 10 shows an overview of intervals in the synthesized view affected by the change of the depth map.

An example on how the changed interval is defined depending on the change of the depth map from $x_{B,s}$ to $x_{B,e}$ is presented in FIG. 10. The changed interval only related to the new depth values is depicted with broken lines. Note that it is not necessary to re-render samples in between $\tilde{x}_{C,e}'$ and $x_{C,e}'$. Although this samples are not updated by rendering the new data, they have been occluded before the depth change. However, at the left side of the changed interval, samples from $x_{C,s}'$ to $\tilde{x}_{C,s}'$ become visible because the foreground edge is shifted to the left by the depth change. These uncovered samples are not updated when rendering the new data from $x_{B,s}$ only. Hence some data of the unchanged depth map left to $x_{B,s}$ may be re-rendered as well.

Figure 11:
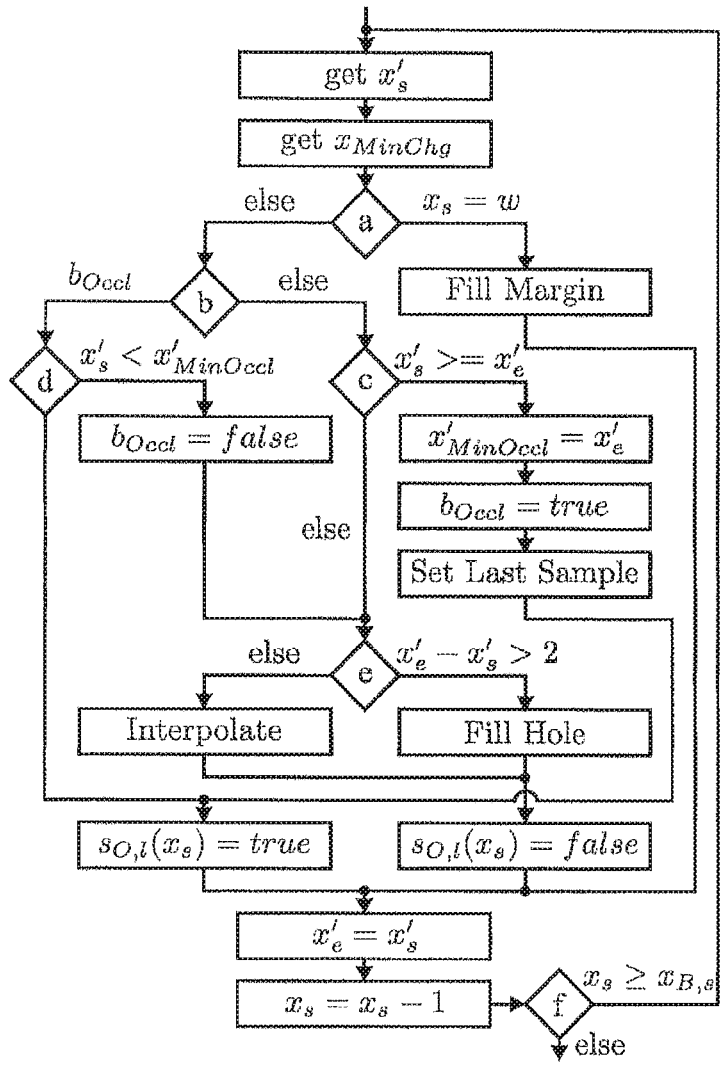
FIG. 11 shows a flow chart of the warping, interpolation and instant hole filling process for changed depth data.

FIG. 11 depicts the rendering algorithm for changed samples of the block B. For initialization $x_e'$ is set to $f_s(x_{B,e}+1, s_{D,l})$, since this is right end of the last changed interval as explained before moreover $x_s$ is set to $x_{B,e}$.

A comparison of the flow chart for rendering as presented in FIG. 11 shows three new processing steps. The computation of the minimal changed position $x_{MinChg}'(x)$ is the first difference. $x_{MinChg}'(x)$ is computed using eq. (31).

$$x_{MinChg}'(x_s)=\min[f_s(x_s,s_{D,l}),f_s(x_s,\tilde{s}_{D,l}),x_{MinChg}'(x_s+1)] \quad (31)$$

Eq. (31) is the iterative solution of eq. (29) and eq. (30). Hence after all samples of the row within block B are processed and $x_s$ is equal to $x_{B,s}$, the minimal changed position $x_{MinChg}'(x_{B,s})$ is equal to $x_{CT,s}'$. $x_{MinChg}'(x_{B,s})$ is used in the next part of the state transition to terminate the rendering process.

The other two new steps in FIG. 11 are the assignments to the occlusion map $s_O$. If the sample at position $f_s(x_s)$ is occluded in the synthesized view, $s_O(x_s)$ is set to true, otherwise to false. The last decision (f) in FIG. 11 shows, that this part of the rendering process is terminated after the leftmost sample of the row of the block B has been processed.

1.3.3.3 Rendering of Data Next to New Data

Figure 12:
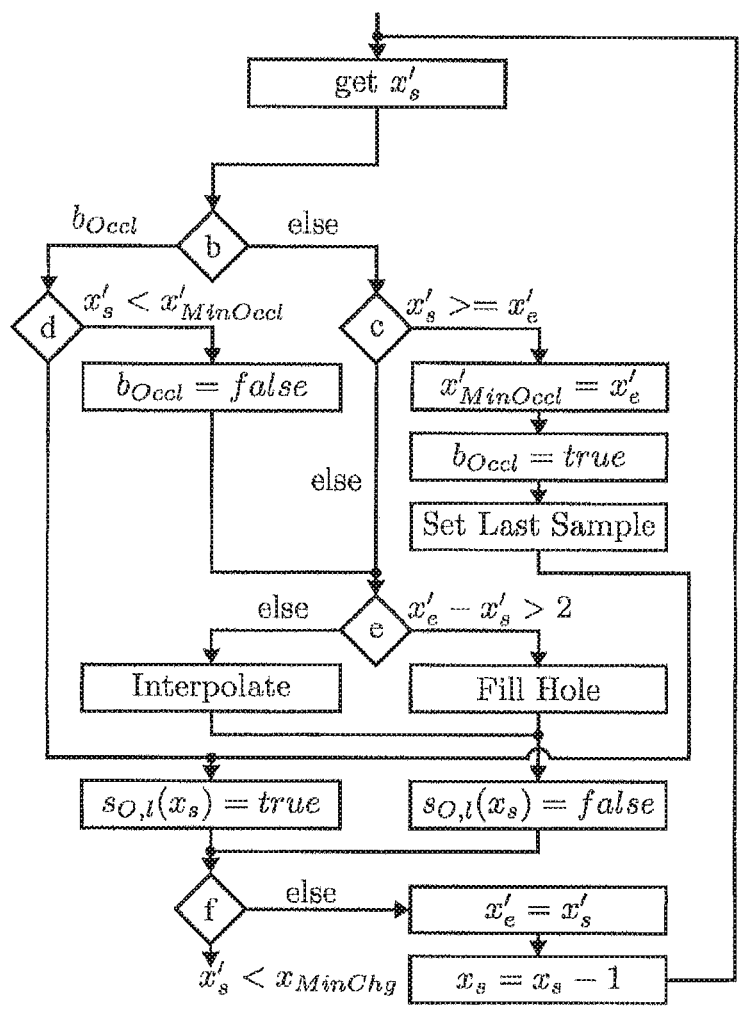
FIG. 12 shows a flow chart of the warping and instant hole filling process for data left to the changed depth data.

With the rendering of data of a row of $\tilde{s}_{D,l}$ within $x_{B,s}$ and $x_{B,e}$ positions from $\tilde{x}_{C,s}'$ to $\tilde{x}_{C,e}'$ are altered in the synthesized texture $s_T'$. However for $x_{CT,s}'<\tilde{x}_{C,s}'$ some samples left to $\tilde{x}_{C,s}'$ are also altered and samples left to $x_{B,s}$ may be re-rendered as well. How this is done is shown in the flowchart in FIG. 12.

In the first iteration the end $x_e'$ of the shifted interval is $f_s(x_{B,s},\bar{s}_{D,l})$ as assigned in the last steps of part two. In contrast to the rendering of the new data, the update of $x_{MinChg}'$ can be omitted. Furthermore the case $x_s=w$ is not possible any more. Hence steps related to that can be omitted as well. At the end of the rendering of a shifted interval it is checked whether its start position $x_s$ is less than the minimal changed position $x_{MinChg}'$. In this case the complete changed interval in the synthesized has been re-rendered and the rendering process of this line can be terminated.

Note that re-rendering data right to $x_{B,e}$ is not necessary for two reasons already mentioned above. The first reason is that samples left to $x_{B,e}+1$ are occluded when shifted right to $f_s(x_{B,e}+1)$ hence the changed data cannot interfere data right to $x_{B,e}+1$. The usage of the $x_{MinChg}'$ variable is the second reason. Samples right to $x_{B,e}$ can occlude samples left to $f_s(x_{B,c})$, however with help of $x_{MinOccl}'$ these occluding samples are left unchanged when rendering the changed data.

1.3.3.4 Adoption of New Depth Values

In the last part of the state transition the next transition is prepared by assigning the changed depth values from $\tilde{s}_{D,l}$ to $s_{D,l}$.

1.3.4 Output

If the input type t is set to produce an output the state of the renderer model remains unchanged. The input to the model is only used to compute the change of the global synthesized view distortion, caused by the change of the depth data within block B.

A simple way to achieve such a behavior would to carry out a state transition to produce the changed synthesized view for the computation of the error change. However, this would involve storing the current renderer state before state transition and to reset it afterwards. In a practical implementation this storing and restoring is associated with multiple memory accesses and high computational complexity. Moreover it is not known beforehand which elements of the state variables are changed and need to be stored.

To avoid these issues the renderer model is designed in a way that the error calculation can directly be conducted without altering elements of the renderer state variables. This property is already reflected in the state transition process as described in the last section. An analysis of this process shows that all decisions conducted there when rendering an interval do not rely on elements of state variables of the new state related to other intervals. Only data of the old state and the input are utilized together with the intermediate variables created for the current interval.

Therefore the state transition algorithm can be easily converted to an error calculation algorithm by two modifications. The first modification is that no assignments to the state variables are executed. The other modification is that error calculation is carried out in all steps that would alter the synthesized output texture in a state transition. Hence, the change of the global synthesized view distortion is calculated instantly after blending a sample. The change of distortion can then be calculated by carrying out the integration in eq. (32) iteratively from $x_{CT,e}'$ to $x_{CT,s}'$ while calculating $\bar{s}_T(x)$.

$$\Delta D = \sum_{x'=x'_{CT,s}}^{x'_{CT,e}} ([\bar{s}_T'(x') - s_{Ref}'(x')]^2 - [s_T'(x') - s_{Ref}'(x')]^2) \quad (32)$$

Note that $\Delta D$ can be negative as well as positive. To reduce computational complexity in a practical implementation of the algorithm, it is also possible to compute $[s_T'(x')-s_{Ref}'(x')]^2$ from eq. (32) already in the state transition and to and store the result as additional state variable holding the current distortion per sample.

Distortion computation for the up-sampled chroma channels is treated likewise. However, in the total distortion sum u- and v-distortion are weighted by one quarter while the weight of the luma channel is one.

1.3.5 Multiple Views

The model presented so far is designed for a left and a right input view and one synthesized output view. However, scenarios with multiple input and multiple output views are possible as well. Distortion computation in multiple synthesized views can be carried out by using one renderer model per output view. The state variables $s_{D,l}$ and can be shared by all models with synthesized views in between the left and the right view. For more than two input views $s_{D,l}$ of one model can be equal to $s_{D,r}$ in another model or vice versa.

Figure 13:
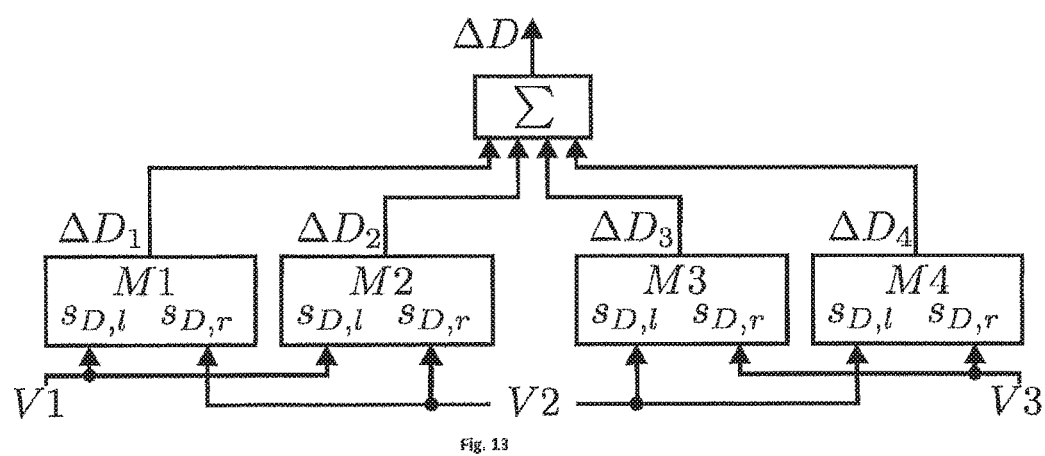
FIG. 13 shows a distortion computation for three input views and two four synthesized views.

An example with three input views and four synthesized views is depicted in FIG. 13. Models M1 and M2 calculate the distortion for two synthesized views in between V1 and V2, whereas models M3 and M4 are used for the distortion computation of two views in between V2 and V3. Model M1 and M2 as well as model M3 and M4 share the same $s_{D,l}$ and $s_{D,r}$. Moreover depth of V2 is $s_{D,r}$ in model M1 and M2 and $s_{D,l}$ in model M3 and M4. The total distortion change can be obtained by summing up $\Delta D_1$ to $\Delta D_4$.

1.4 Conclusion

An embodiment for the synthesized view distortion computation has been presented that can be utilized in the processing of depth data like depth estimation, depth filtering and depth coding.

Unlike other methods, which only provide an estimate of the synthesized view distortion, the embodiment described above provides the correct change of the total synthesized view distortion related to a change of depth data. The calculation of the total synthesized view distortion involves a complete synthesized view, hence a complete depth map is needed, even if only the distortion of a depth block should be evaluated. Therefore the already processed depth is assumed in already processed parts of the depth map and original depth data in the non-processed regions.

For view synthesize a simple rendering algorithm is used providing the basic features of more complex approaches, like view interpolation and view extrapolation, sub pixel accurate rendering, line wise hole filling and distance dependent blending with front most decision or usage of mainly one view. In contrast to other approaches these features are fully regarded in the distortion computation.

To reduce computational complexity the embodiment outlined above only re-renders or calculates the distortion in parts that are affected by the depth change. This is carried out by the renderer model. Key features to increase the processing speed are:

Storage of intermediate data: Intermediate data of the rendering process is stored as state of the renderer model and re-used.

State transition or error calculation: A state transition is carried out to adapt the renderer model to finally processed depth data. This triggers the re-rendering of the corresponding changed part of the synthesized view and modifies the stored intermediate variables. In the error calculation mode the synthesized view distortion is provided without altering the renderer model state. Hence, multiple depth changes can be evaluated rapidly without resetting the state transitions.

Instant occlusion handling: Occlusion handling is integrated to the warping process. Instead of using complex z-buffer methods, background samples are identified by their shifted position.

Instant hole filling: Holes are identified and filled within warping process. For interpolation hole positions are additionally marked and possibly filled from the second view when blending. In contrast to other approaches the instant hole filling enables the extrapolation from occluded background neighbor samples.

Sub-sample accuracy using pre-interpolation: The texture data is interpolated, when initializing the renderer model. In the warping process positions of the synthesized view are only mapped to positions of the up-sampled texture data.

Instant blending: As soon as a view's sample is rendered in the warping process it is blended with the sample from the other view.

Instant error calculation: If the renderer model shall provide the synthesized view distortion, the error for a sample is directly computed, when the new sample is rendered.

Interval-wise rendering All processing steps of renderer are integrated to an algorithms that processes the changed depth map by carrying out one iteration per sample. Likewise each changed sample of the output view is updated one time in the rendering process.

Minimal re-rendering The changed interval in the synthesized view is determined while warping. When all changed samples in the synthesized view have been updated the re-rendering process is stopped.

Parallelization: Rendering can be carried out for each row independently. Hence parallelization is possible.

2 VIEW SYNTHESIS DISTORTION CHANGE BASED ENCODING

This chapter organizes as follow: In section 2.1 it is described how the render model may be integrated in the rate-distortion optimization of the HM encoder software. Moreover it is explained in section 2.2 how reference views for the encoding processed can be derived.

2.1 Integration of the Render Model in the HM Encoder

In this section it is described how the renderer model is integrated in the rate-distortion optimization of the HM encoder software 3.0. Since the renderer model has to be in the correct state to provide a correct distortion, it is not sufficient to only replace distortion calculation methods. State transitions of the renderer model may be triggered by the encoder, when decisions on how to encode a block have been made or when already done decisions are withdrawn. The conventional rate-distortion optimization in the HM Encoder is described in section 2.1.1. After that modification conducted to integrate the renderer model to the encoder are presented in section 2.1.2.

Since the renderer model provides a new distortion calculation metric, the Lagrange multiplier may be adapted as well to optimize the results attained using the renderer model. Section 2.1.3 provides information how this has been conducted.

2.1.1 Rate-Distortion Optimization in the HM Encoder

Figure 14:
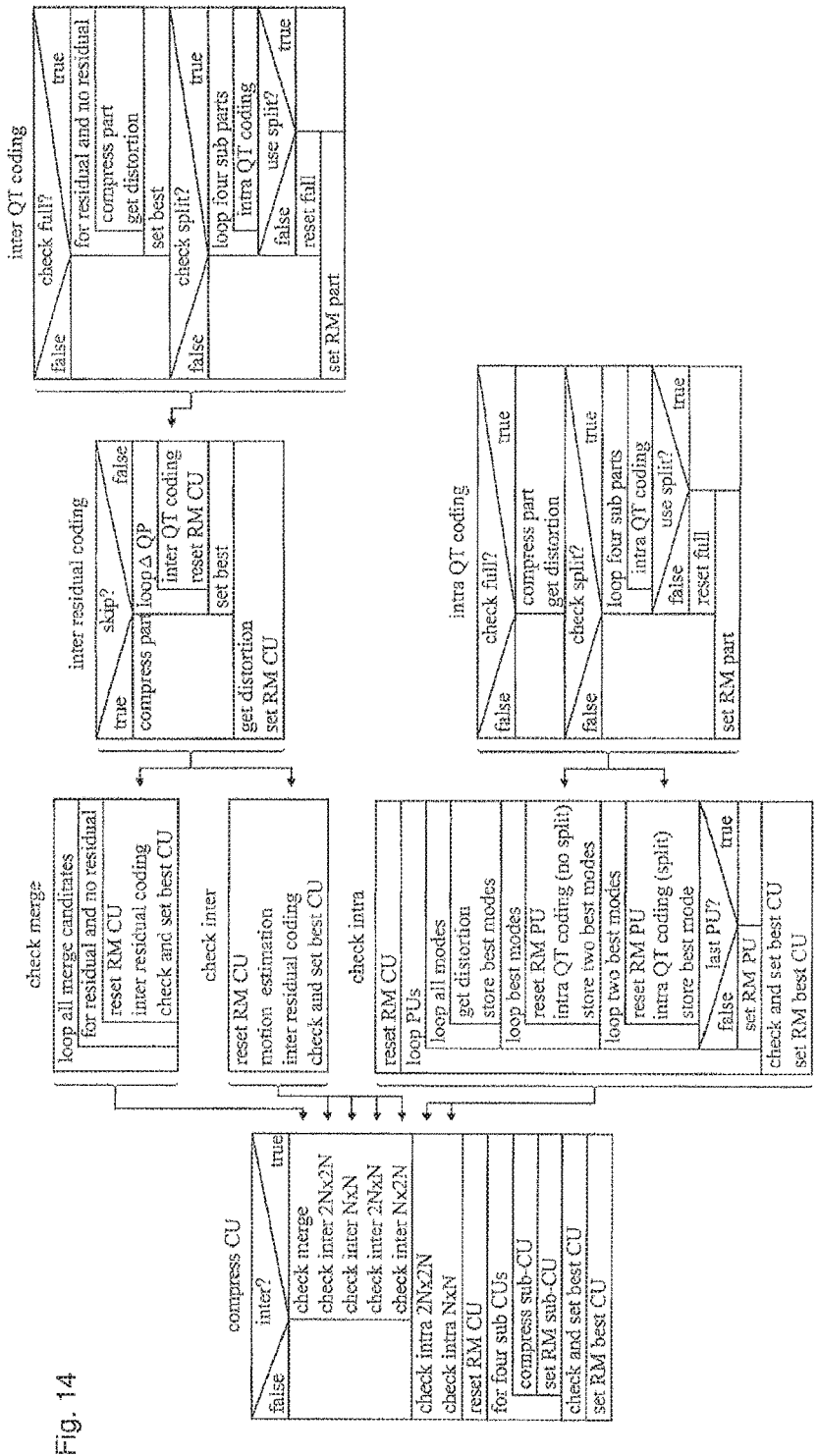
FIG. 14 shows the modifications to a encoder to integrate the present concept

FIG. 14 gives a rough overview of the rate-distortion optimization of the HM encoder software version 3.0 [5]. The figure shows a structogram containing the single steps and decisions needed to compress a single coding unit (CU). Steps related to the optimization of the synthesized view are placed against a gray background and not part of the original algorithm. These steps are discussed in the next section 2.1.2.

Decisions in the encoding process are made based on the rate-distortion cost J defined as $$J = D + \lambda \cdot R \qquad (33)$$

with D and R denoting the distortion and rate of the currently evaluated block and mode. $\lambda$ is the Lagrange multiplier depending on the quantization parameter and the slice type. As depicted in FIG. 14 the encoding process of a CU is hierarchical. Results of taken decisions like rate and distortion are passed from the lower levels performing the encoding of the residual quadtree (inter QT coding, intra QT coding) to the top level (compress CU). The single building blocks are:

compress CU: At the top level a check of the merge mode, four different inter partitions (2N×2N, N×N, 2N×N, N×2N) and two different intra partitions (2N×2N, N×N) is executed. Within each check the encoder compares one or multiple modes to the currently best mode carrying out a rate-distortion based decision. The winner of this test is stored as new best mode. In the structogram this testing step is denoted as "check and set best". After testing all inter and intra partitions, it is tested if a split of the CU in four sub-CUs yields a better rate-distortion performance. Therefore each sub-CU is recursively compressed before comparing the total rate-distortion cost of all four sub-CUs to the currently best costs.

check merge: When checking the merge mode all suitable merge candidates are tested with and without residual and the best result is preserved.

check inter: Motion vectors are estimated for all parts of the CU. Details of the motion estimation are not explicitly shown in the structogram. However, the estimation is carried out based on rate-distortion cost testing different reference pictures as well as P and B prediction. Rate-distortion costs used in inter residual coding are not exact, but only estimations. Hence, exact costs are obtained by encoding the motion vectors and the residual subsequently to the motion estimation.

inter coding: Inter coding can be tested with and without skipping the residual. If the CU is compressed without residual, the distortion is computed in the next step. For non-skip modes it is possible to test different quantization parameters offsets (ΔQPs) when compressing the residual quadtree. Since inter quadtree coding returns an approximated distortion from unclipped signal vales only, the distortion is exactly re computed in the last step.

inter QT coding: This building block estimates recursively a rate-distortion optimized quadtree structure to compress the residual. A block of the residual can either be coded fully or split up in four parts. Moreover it is possible to skip the residual for each part independently. Therefore the compression of the full block is checked with and without residual first. The best result and the rate-distortion costs are stored. Subsequently, a further split is checked recursively, if the highest partitioning depth, has not been reached yet. If splitting does not result in better costs the results of coding the full block is restored afterwards.

check intra: For intra CUs all PUs are optimized successively. To minimize computational complexity the optimization is carried out in a three-step approach. First all modes are tested using the rate for mode signaling and distortion of the prediction only. A small number of best modes are stored for further investigation. In the second step these stored modes are tested using a quadtree without splitting. All modes, but the two best modes are rejected. In the last step the best mode is chosen out of this two, based on a test considering a quadtree of full depth.

intra QT coding: Encoding of the intra quadtree is similar to the encoding of the inter quadtree. A difference is that it is not tested, whether the residual should be skipped.

2.1.2 Modifications of the Rate-Distortion Optimization

To enable rate-distortion optimization using the synthesized view distortion the renderer model is integrated in the encoding process. Therefore conventional distortion computation carried out while encoding is replaced with computation of the global distortion change of synthesized view in all distortion computation steps depicted in FIG. 2 and/or FIG. 14. However, to reduce computational complexity the render model is not used in the motion estimation step, here.

To provide valid distortion changes the renderer model has to be in the correct state. Hence, the input depth map state variable of the renderer model may incorporate the coded depth data of all previously coded blocks and original depth data of all other blocks. To achieve this, the renderer model is continuously updated while encoding. This is done by the steps highlighted gray in FIG. 2 and/or FIG. 14. Steps denoted "set RM" mean that change of the currently evaluated depth block is give as input to the renderer model to perform a state transition. Steps named "reset RM" also conduct a state transition of the renderer model. However, here the current depth block is reset to original input data. In the following it is discussed when depth data is set or reset in the renderer model.

When encoding the residual signal the depth data of the renderer model is set for each block of the CU belonging to a leaf of the residual quadtree. Hence, when encoding a node of the tree, depth data belonging to already encoded siblings is up to date in the renderer model.

To encode the same block of depth data in a different mode, or with other parameters it is useful to reset the data of the block. For inter coding this is done subsequently to the compression of the quadtree before encoding with another quantization parameter in the "inter residual coding" block. For intra coding this reset is carried out for before a new PU is coded in the stages of the mode decision refinement process. After the optimal mode for a PU has been found in the intra check, the coded data the PU is set in the renderer model, before compressing the next PU.

Moreover it can be seen in FIG. 2 and/or FIG. 14 that the complete CU is reset at the begin of checking a merge candidate, the inter modes and the intra modes. This is done to ensure that all data potentially set by tests of modes carried out before is reset.

When checking if the CU is split up in the top level block ("compress CU") a reset is performed as well. The result of the optimization of a sub-CU is set in the renderer model in the sub-CU checking loop, to ensure a correct renderer state for the following sub-CUs.

Finally, as last step in the ("compress CU") block the result of the optimization is set in the renderer model before continuing with the next CU.

2.1.3 Lagrange Multiplier Optimization

The usage of synthesized view distortion in rate-distortion decisions involves the adaptation of the Lagrange multiplier λ to obtain optimal encoding result. This adaptation is carried out in two step approach. In the first step the Lagrange multiplier is adjusted roughly using a constant factor. A fine tuning using a factor depending on the quantization parameters conducted in the second step.

For the rough adaptation rate-distortion cost computation, as presented in eq. (33) has been modified to $$J = \Delta D + l_s \cdot \lambda \cdot R \qquad (34)$$

with ΔD denoting the change of global synthesized view distortion as provided by the renderer model and $l_s$ as constant scaling factor. Coding experiments show that $l_s$=0.5 provides good results for high quantization parameters. For the exact optimization a quantization parameter dependent scaling factor has been determined by coding experiments.

2.2 Synthesized View References

As described in section 1.1.1 the renderer model uses a reference view $s_{Ref}^t$ for distortion calculation. This reference view can be an original view or a rendered view. Whether an original view or a rendered view should be used depends on the use case.

Intermediate original views are often not available, hence an optimization can only be carried out by warping the left original view to the right original view and vice versa. Such an optimization leads to a rate constraint depth re-estimation carried out by the encoder. Although it is possible that depth error in the initial depth maps are reduced, it is also possible that information in the depth maps retrieved by more complex depth estimation approaches are reduced as well. This is especially true for areas that are occluded in the original view and might lead to rendering artifacts when synthesizing intermediate views.

Rate-distortion optimization utilizing a rendered reference views yields better preservation of the original synthesized views. Moreover multiple intermediate views can be used. However, one drawback is that rendering artifacts due to already existing errors in the depth map are preserved as well. In the following the usage of rendered reference views is discussed for the cases of view extrapolation and view interpolation.

2.2.1 View Extrapolation

Figure 15:
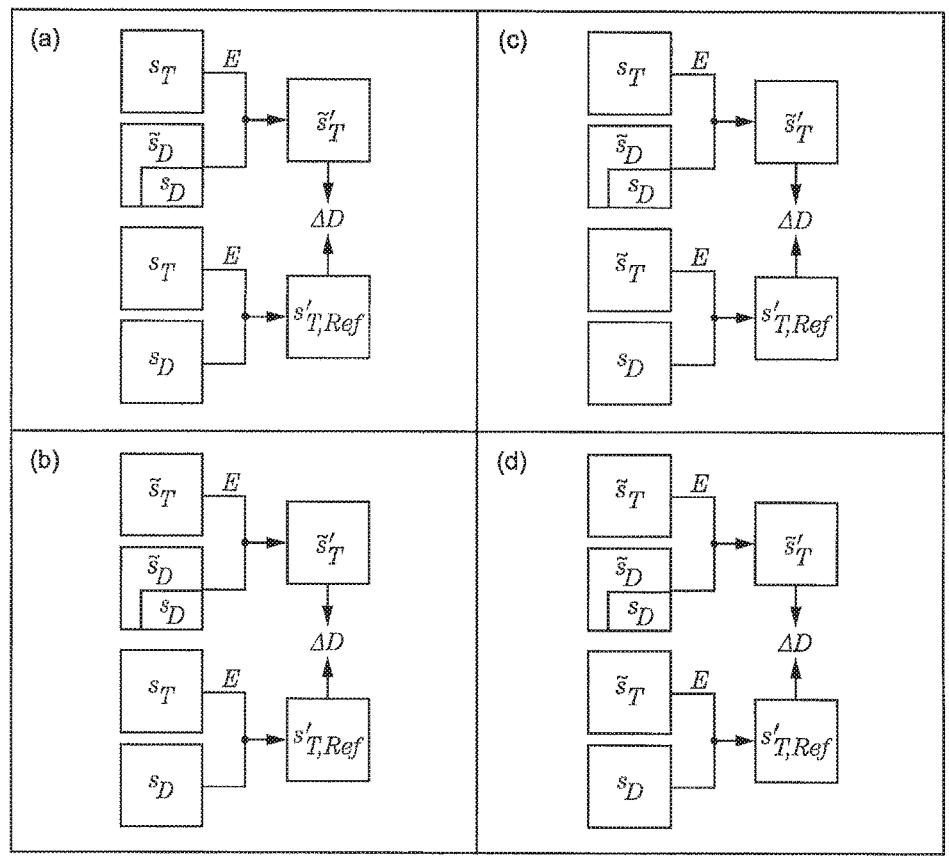
FIG. 15 shows different possibilities to generate the reference view $s_{Ref}'$ and the view to test $s_T'$.

Eq. (2) shows that distortion calculation is carried out by a comparison of the rendered reference view to $s_{Ref}'$ to the distorted view $\bar{s}_T'$. Moreover it can be seen from eq. (1) that the extrapolated view depends on a depth map and a video. This raises the question, if coded or uncoded depth and video data should be used to render $s_{Ref}'$ and $\bar{s}_T'$. Since the depth data is not coded yet, original data $s_D$ are used for the generation of the reference view, whereas the partly coded depth map $s_T'$ is used for rendering $\bar{s}_T'$, as described above. Assuming that the video data of the view has been coded before the depth data, it is possible to use coded or uncoded texture data for rendering of the reference texture and the texture $s_{Ref}'$. All four possibilities are depicted in FIG. 15.

Combination (a) uses the original texture data for rendering $\bar{s}_T'$ and $s_{Ref}'$. The approach is especially suitable if the encoding of the depth should not depend on the texture coding. Nevertheless, distortions caused by the coded texture are neglected. A comparison of $\bar{s}_T'$. rendered with coded texture data compared to $s_{Ref}'$ rendered with original data is carried out when using combination (b). The total distortion includes not only the distortion of the depth, but also distortions caused by the texture coding. However, since the renderer model only regards distortion changes $\Delta D$ caused by a depth change this bias does not infer the rate-distortion optimization. Theoretically it is possible for this combination that the encoding of depth data reduces the distortion due to coded texture. An example for this are distorted video samples that become occluded, when encoding the depth data. Using the coded texture to render the reference $s_{Ref}'$ and the uncoded for the view to test $\bar{s}_T'$ as done for combination (c) has no practical use. For the last combination (d) $\tilde{s}_T'$ and $s_{Ref}'$ are both rendered from the coded texture. Hence, the influence of the coded texture can be regarded in the encoding process although the total distortion is not biased by the texture distortion. This approach has the advantage that signal parts in the depth data related to signal parts or noise in the original texture and removed by encoding are neglected when encoding the depth data.

Evaluations show that combination (b) yields the highest gains.

2.2.2 Interpolation

For view interpolation two textures and two depth maps are used as shown in equation eq. (12). Similar to the extrapolation case, there are multiple combinations possible in the rate-distortion optimization for rendering the reference view and the view to test. These combinations are discussed in the following. For simplification it is assumed that coding is carried out in the order: left video $s_{T,l}$, left depth $s_{D,l}$, right video $s_{T,r}$ and right depth $s_{D,r}$.

When encoding the first (left) depth map $s_{D,l}$ the corresponding texture $s_{T,l}$ has already been coded and texture $s_{T,r}$ and depth $s_{D,r}$ of the right view is still uncoded. Hence, if interpolation should be carried out this has to be performed using the original video and depth data of the right view. In the blending step the rendered distorted left view $\tilde{s}_{T,l}'$ is then blended with a undistorted rendered right view $s_{T,r}'$. This leads to a reduction of distortion change $\Delta D$ obtained in the optimization. Note, that the usage of the uncoded data of the right view is in line with the concept applied generally in the renderer model. Whilst block wise evaluation the render model utilizes original data from uncoded blocks, hence using uncoded data of the right view extents this concept. For rendering the reference view $s_{Ref}'$ and the view to test $\bar{s}_T'$ it is possible to use the coded or the uncoded left texture $s_{T,l}'$. Thus the same combinations as presented for view extrapolation are applicable.

An alternative to rendering using the original data of the right view is to disregard this view and to carry out extrapolation. This approach neglects the blending process and guarantees an optimized shifted left view $s_{T,l}'$. In contrast to the shifted left view obtained from assuming original data for the right view, this shifted left view might be a more reliable base for rendering the synthesized view $s_T'$, since it is not know which kind of distortion will be introduced when encoding the data of the right view.

When encoding the second depth $s_{D,r}$ the corresponding texture $s_{T,r}$ and texture $s_{T,l}$ and depth $s_{D,l}$ of the left view have already been coded. For all three signals the coded or the uncoded data can be employed to render $s_T'$ and $s_{Ref}'$. This gives eight possibilities to render $s_T'$ and eight possibilities to renders $s_{Ref}'$ and leads to 64 possible combinations that could be utilized in the rate-distortion optimization process. However, most of these combinations are not suitable for the rate-distortion optimization. Additional it is, like for the first view, possible to ignore the left view, when optimizing the depth data of the right view. The blending step in rendering is neglected and the left view is extrapolated from the right view.

Figure 16:
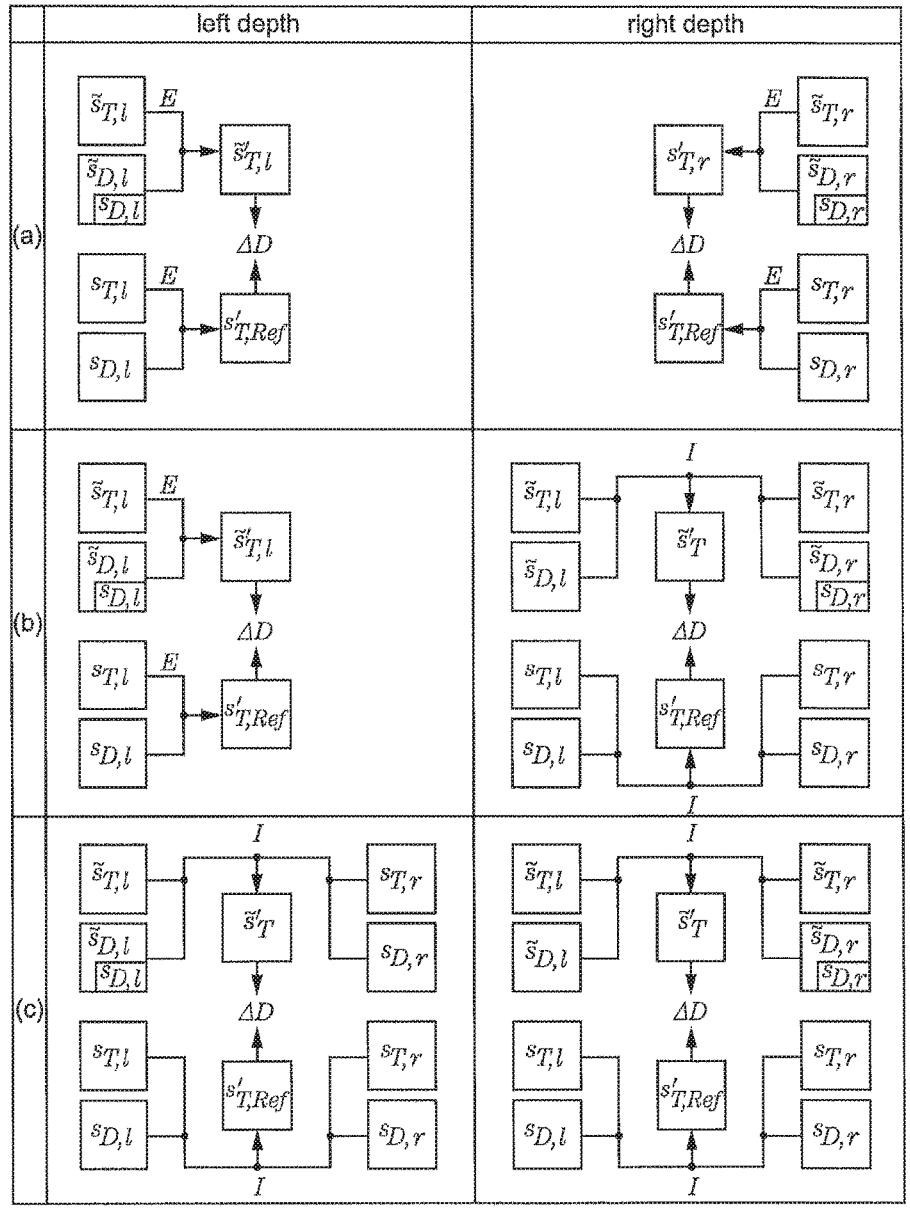
FIG. 16 shows different possibilities to generate the reference view $s_{Ref}'$ and the view to test $s_T'$.

An overview of three feasible methods to generate the reference and the view to test selected from numerous possible combinations is given in FIG. 16.

For all methods the reference views are generated from uncoded texture and depth data. Method (a) performs an independent coding of the left and the right view. The reference views and the views to test are extrapolated. For the views to test the already coded textures are used. In method (b) extrapolation carried out only when encoding the left depth, since coded data for the right view is not available. When encoding the right view interpolation of the view to test is conducted using the already coded texture and depth data from the right view. Method (c) uses interpolation for encoding the left and the right view. Since no coded data of the right view is available when encoding the left view, original texture and depth data is utilized. To perform the encoding of the depth data independent from the encoding of texture data, it is also possible to replace the coded texture $\tilde{s}_{T,l}$ and $\tilde{s}_{T,l}$ data with uncoded data $s_{T,l}$ and $s_{T,r}$ for all three methods.

An evaluation of all six possibilities has been conducted. It was found that combination (c) using encoded texture data yields the best rate-distortion performance.

3 APPENDIX

3.1 Proof

The proof is valid for rendering from a left view to create a synthesized right view. However the other direction can be proven in the same manner. It is shown that a input sample at position x that is shifted to $f_s(x)$ is occluded if $f_s(x) \geq f_s(x+1)$.

$$f_S(x) \geq f_S(x+1) \Leftrightarrow x - s_{Disp}(x) \geq x + 1 - s_{Disp}(x+1) \Rightarrow \quad (35)$$

$$s_{Disp}(x) \leq s_{Disp}(x+1) \Leftrightarrow \frac{f \cdot x_B}{s_Z(x)} \leq \frac{f \cdot x_B}{s_Z(x+1)} \Leftrightarrow s_Z(x) \geq s_Z(x+1)$$

It can be concluded that depth at position $s_z(x)$ is greater than or equal to the depth at position $s_z(x+1)$. Hence the sample at position i is occluded in the synthesized view. Note it also assumed that background samples left of a foreground object in the input view do not appear in a disocclusion at the right side of foreground in the synthesized view.

Thus, a concept for the fast computation of distortion in one or multiple views synthesized from multi-view plus depth data has been presented in the above embodiment. The algorithm can be utilized in the estimation, filtering or compression of depth data. Unlike other methods that estimate the distortion in synthesized views caused by a distortion of depth data the above embodiment computes the exact distortion change of the synthesized view using a simple rendering algorithm. Hence effects of occlusion, disocclusion, blending and hole filling are regarded. For complexity reduction the distortion computation is carried out by only re-rendering of parts of synthesized view that are affected by a change of the depth data. The rendering process is modeled as a finite state machine accepting depth changes as input, holding the current rendering state, and giving the synthesized view distortion change as output. It has been discussed how the renderer model can be integrated to the HM software encoder. Different methods to create synthesized reference textures for the encoding process are presented.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] A. Smolic, K. Mueller, P. Merkle, P. Kauff, and T. Wiegand, An overview of available and emerging 3D video formats and depth enhanced stereo as efficient generic solution, in Proceedings of the 27th conference on PCS, (Piscataway, N.J., USA), pp. 389-392, 2009.

[2] B. T. Oh, J. Lee, and D.-S. Park, Depth map coding based on synthesized view distortion function, Selected Topics in Signal Processing, IEEE Journal of, vol. 5, pp. 1344-1352, November 2011.

[3] W.-S. Kim, A. Ortega, P. Lai, D. Tian, and C. Gomila, Depth map distortion analysis for view rendering and depth coding, pp. 721-724, November 2009.

[4] W.-S. Kim, A. Ortega, P. Lai, D. Tian, and C. Gomila, Depth map coding with distortion estimation of rendered view, in Society of Photo-Optical Instrumentation Engineers (SPIE) Conference Series, vol. 7543 of Society of Photo-Optical Instrumentation Engineers (SPIE) Conference Series, January 2010.

[5] HEVC Test Model 3 (HM 3) Encoder Description (MPEG/N20270), ISO/IEC JTC1/SC29/WG11, 2011.

[6] Report on experimental framework for 3D video coding (MPEG/N11631), 2010.

[7] Reference Softwares for Depth Estimation and View Synthesis (MPEG/N15377), ISO/IEC JTC1/SC29/WG11, 2008.

[8] View Synthesis Reference Software (VSRS) 3.5, wg11.sc29.org, March 2010.

The invention claimed is:

1. An encoder for coding a video comprising:
a depth encoding mechanism configured to encode, using a processor, a depth map associated with a view of a video; and
a distortion measurement mechanism configured to determine, using a processor, a distortion change of a first view of a video synthesized from a second view of the video, the distortion change being caused by a modification to a depth map of the second view, wherein the distortion measurement mechanism is configured to:
obtain first and second synthesis states of the first view, the first synthesis state corresponding to a synthesis of the first view based on the depth map of the second view comprising a first portion in a coded state and a second portion in a non-coded state, and the second synthesis state corresponding to a synthesis of the first view based on the depth map of the second view comprising the first portion and a currently encoded portion of the second portion both in the coded state, and
determine the distortion change based on first and second distortion measures with respect to the first and second synthesis states of the first view, respectively.

2. The encoder according to claim 1, wherein the first and second distortion measures are determined relative to an undistorted version of the first view, and the distortion measurement mechanism is configured to obtain the undistorted version of the first view in accordance with a synthesis of the first view from the second view based on the depth map of the second view in the non-coded state.

3. The encoder according to claim 1, wherein the distortion measurement mechanism is configured to obtain and determine with regard to a section of the first view within which changes occur between the first synthesis state and the second synthesis state.

4. The encoder according to claim 1, wherein the distortion measurement mechanism is configured to use a per-pixel difference measure for determining the distortion of the respective synthesis state.

5. The encoder according to claim 1, wherein the distortion measurement mechanism is configured to warp texture samples of the currently coded portion from the second view into the first view using the coded state of the depth map of the second view and determine the distortion of the second synthesis state of the first view based the warped texture samples.

6. The encoder according to claim 5, wherein the distortion measurement mechanism is configured to, interpolate the warped texture samples onto sample positions of the first view.

7. A decoder for decoding a video comprising:
a depth decoding mechanism configured to decode, using a processor, a depth map associated with a first view of a video,
wherein information related to the first view is used to determine a distortion change of a second view of the video, the second view being synthesized from the first view of the video, the distortion change being caused by a modification to the depth map of the first view, wherein the distortion change of the second view is determined at least by:
obtaining first and second synthesis states of the second view, the first synthesis state corresponding to a synthesis of the second view based on the depth map of the first view comprising a first portion in a coded state and a second portion in a non-coded state, and the second synthesis state corresponding to a synthesis of the second view based on the depth map of the first view comprising the first portion and a currently encoded portion of the second portion both in the coded state, and
determining the distortion change based on first and second distortion measures with respect to the first and second synthesis states of the second view, respectively.

8. The decoder according to claim 7, wherein the first and second distortion measures are determined relative to an undistorted version of the second view, and the undistorted version of the second view is obtained in accordance with a synthesis of the second view based on the depth map of the first view in the non-coded state.

9. The decoder according to claim 7, wherein the steps of obtaining and determining are performed with regard to a section of the second view within which changes occur between the first synthesis state and the second synthesis state.

10. The decoder according to claim 7, wherein the step of determining includes use a per-pixel difference measure for determining the distortion of the respective synthesis state.

11. The decoder according to claim 7, wherein the distortion change of the second view is determined further by warping texture samples of the currently encoded portion from the first view into the second view using the coded state of the depth map of the first view and determining the distortion of the second synthesis state of the second view based on the warped texture samples.

12. The decoder according to claim 11, wherein the warped texture samples are interpolated onto sample positions of the second view.

13. The decoder according to claim 12, wherein the interpolation includes hole filling or blending with another view of the video.

14. A method of decoding a video comprising:
decoding, using a processor, a depth map associated with a first view of a video; and
determining, based on information related to the first view, a distortion change of a second view of the video, the second view being synthesized from the first view of the video, the distortion change being caused by a modification to the depth map of the first view, wherein the determining the distortion change of the second view comprises:
- obtaining first and second synthesis states of the second view, the first synthesis state corresponding to a synthesis of the second view based on the depth map of the first view comprising a first portion in a coded state and a second portion in a non-coded state, and the second synthesis state corresponding to a synthesis of the second view based on the depth map of the first view comprising the first portion and a currently encoded portion of the second portion in the coded state, and
- determining the distortion change based on first and second distortion measures with respect to the first and second synthesis states of the second view, respectively.

15. The method according to claim 14, wherein the first and second distortion measures are determined relative to an undistorted version of the second view, and the method further comprising obtaining the undistorted version of the second view in accordance with a synthesis of the second view based on the depth map of the first view in the non-coded state.

16. The method according to claim 14, wherein the steps of obtaining and determining are performed with regard to a section of the second view within which changes occur between the first synthesis state and the second synthesis state.

17. The method according to claim 14, wherein the step of determining includes use a per-pixel difference measure for determining the distortion of the respective synthesis state.

18. The method according to claim 14, wherein the determining the distortion change further comprises warping texture samples of the currently encoded portion from the first view into the second view using the coded state of the depth map of the first view, and determining the distortion of the second synthesis state of the second view based on the warped texture samples.

19. The method according to claim 18, further comprising interpolating the warped texture samples onto sample positions of the second view.

20. A non-transitory computer-readable medium for storing instructions, which when executed by a processor, generates data associated with a video, comprising:
- a data stream comprising a depth map associated with a first view of a video, the instructions comprising:
- encoding the depth map associated with the first view; and
- determining a distortion change of a second view of the video, the second view being synthesized from the first view of the video and the distortion change being caused by a modification to the depth map of the first view, and the determining including:
  - obtaining first and second synthesis states of the second view, the first synthesis state corresponding to a synthesis of the second view based on the depth map of the first view comprising a first portion in a coded state and a second portion in a non-coded state, and the second synthesis state corresponding to a synthesis of the second view based on the depth map of the first view comprising the first portion and a currently encoded portion of the second portion in the coded state, and
  - determining the distortion change based on first and second distortion measures with respect to the first and second synthesis states of the second view, respectively.

* * * * *